(12) United States Patent
Gaudiosi et al.

(10) Patent No.: US 8,619,357 B2
(45) Date of Patent: Dec. 31, 2013

(54) STATIC PHASE MASK FOR HIGH-ORDER SPECTRAL PHASE CONTROL IN A HYBRID CHIRPED PULSE AMPLIFIER SYSTEM

(75) Inventors: David M. Gaudiosi, Orlando, FL (US); Mehmetcan Akbulut, Orlando, FL (US)

(73) Assignee: Raydiance, Inc., Petaluma, CA (US)

( * ) Notice: Subject to any disclaimer, the term of this patent is extended or adjusted under 35 U.S.C. 154(b) by 295 days.

(21) Appl. No.: 13/019,209

(22) Filed: Feb. 1, 2011

(65) Prior Publication Data
US 2011/0122484 A1    May 26, 2011

Related U.S. Application Data

(62) Division of application No. 11/998,772, filed on Nov. 30, 2007, now Pat. No. 7,903,326.

(51) Int. Cl.
*H01S 3/00* (2006.01)

(52) U.S. Cl.
USPC .......................................................... 359/333

(58) Field of Classification Search
USPC .................................. 359/333, 341.1; 372/25
See application file for complete search history.

(56) References Cited

U.S. PATENT DOCUMENTS

| | | | |
|---|---|---|---|
| 2,436,662 A | 2/1948 | Norgaard | |
| 3,459,960 A | 8/1969 | Aaland et al. | |
| 3,549,256 A | 12/1970 | Brienza et al. | |
| 3,599,019 A | 8/1971 | Nannichi et al. | |
| 3,602,836 A | 8/1971 | Young | |
| 3,626,318 A | 12/1971 | Young | |
| 3,646,469 A | 2/1972 | Buczek et al. | |
| 3,654,624 A | 4/1972 | Becker et al. | |
| 3,764,641 A | 10/1973 | Ash | |
| 3,806,829 A | 4/1974 | Duston et al. | |
| 3,808,549 A | 4/1974 | Maurer | |
| 3,851,267 A | 11/1974 | Tanner | |
| 3,963,953 A | 6/1976 | Thornton, Jr. | |
| 4,061,427 A | 12/1977 | Fletcher et al. | |
| 4,194,813 A | 3/1980 | Benjamin et al. | |
| 4,289,378 A | 9/1981 | Remy et al. | |
| 4,449,215 A | 5/1984 | Reno | |
| 4,590,598 A | 5/1986 | O'Harra, II | |
| 4,718,418 A | 1/1988 | L'Esperance, Jr. | |
| 4,730,113 A | 3/1988 | Edwards et al. | |
| 4,750,809 A | 6/1988 | Kafka et al. | |

(Continued)

FOREIGN PATENT DOCUMENTS

| | | |
|---|---|---|
| EP | 0214100 | 3/1987 |
| EP | 0691563 | 1/1996 |

(Continued)

OTHER PUBLICATIONS

Agostinelli, J. et al., "Optical Pulse Shaping with a Grating Pair," Applied Optics, vol. 18, No. 14, pp. 2500-2504, Jul. 15, 1979.

(Continued)

*Primary Examiner* — Mark Hellner
(74) *Attorney, Agent, or Firm* — Haverstock & Owens, LLP

(57) ABSTRACT

A chirped pulse amplification (CPA) system comprises an optical pulse stretcher and an optical pulse compressor that are mismatched in that the optical pulse compressor includes a bulk optical grating while the optical pulse stretcher does not. High order dispersion compensation is provided by an optical phase mask disposed within the optical pulse compressor.

9 Claims, 7 Drawing Sheets

(56) References Cited

U.S. PATENT DOCUMENTS

| | | |
|---|---|---|
| 4,808,000 A | 2/1989 | Pasciak |
| 4,827,125 A | 5/1989 | Goldstein |
| 4,829,529 A | 5/1989 | Kafka |
| 4,835,670 A | 5/1989 | Adams et al. |
| 4,847,846 A | 7/1989 | Sone et al. |
| 4,848,340 A | 7/1989 | Bille et al. |
| 4,856,011 A | 8/1989 | Shimada et al. |
| 4,902,127 A | 2/1990 | Byer et al. |
| 4,907,586 A | 3/1990 | Bille et al. |
| 4,913,520 A | 4/1990 | Kafka |
| 4,915,757 A | 4/1990 | Rando |
| 4,928,316 A | 5/1990 | Heritage et al. |
| 4,947,398 A | 8/1990 | Yasuda et al. |
| 4,950,268 A | 8/1990 | Rink |
| 4,972,423 A | 11/1990 | Alfano et al. |
| 4,983,034 A | 1/1991 | Spillman, Jr. |
| 4,994,059 A | 2/1991 | Kosa et al. |
| 5,010,555 A | 4/1991 | Madey et al. |
| 5,014,290 A | 5/1991 | Moore et al. |
| 5,022,042 A | 6/1991 | Bradley |
| 5,031,236 A | 7/1991 | Hodgkinson et al. |
| 5,043,991 A | 8/1991 | Bradley |
| 5,095,487 A | 3/1992 | Meyerhofer et al. |
| 5,098,426 A | 3/1992 | Sklar et al. |
| 5,154,707 A | 10/1992 | Rink et al. |
| 5,159,402 A | 10/1992 | Ortiz, Jr. |
| 5,162,643 A | 11/1992 | Currie |
| 5,166,818 A | 11/1992 | Chase et al. |
| 5,187,759 A | 2/1993 | DiGiovanni et al. |
| 5,204,867 A | 4/1993 | Koschmann |
| 5,206,455 A | 4/1993 | Williams et al. |
| 5,233,182 A | 8/1993 | Szabo et al. |
| 5,255,117 A | 10/1993 | Cushman |
| 5,265,107 A | 11/1993 | Delfyett, Jr. |
| 5,301,347 A | 4/1994 | Kensky |
| 5,302,835 A | 4/1994 | Bendett et al. |
| 5,309,453 A | 5/1994 | Treacy |
| 5,315,436 A | 5/1994 | Lowenhar et al. |
| 5,355,383 A | 10/1994 | Lockard |
| 5,400,350 A | 3/1995 | Galvanauskas |
| 5,418,809 A | 5/1995 | August, Jr. et al. |
| 5,428,471 A | 6/1995 | McDermott |
| 5,430,572 A | 7/1995 | DiGiovanni et al. |
| 5,440,573 A | 8/1995 | Fermann |
| 5,450,427 A | 9/1995 | Fermann et al. |
| 5,479,422 A | 12/1995 | Fermann et al. |
| 5,489,984 A | 2/1996 | Hariharan et al. |
| 5,493,579 A | 2/1996 | Ressl et al. |
| 5,517,043 A | 5/1996 | Ma et al. |
| 5,548,098 A | 8/1996 | Sugawara et al. |
| 5,572,335 A | 11/1996 | Stevens |
| 5,572,358 A | 11/1996 | Gabl et al. |
| 5,585,642 A | 12/1996 | Britton et al. |
| 5,585,652 A | 12/1996 | Kamasz et al. |
| 5,585,913 A | 12/1996 | Hariharan et al. |
| 5,590,142 A | 12/1996 | Shan |
| 5,592,327 A | 1/1997 | Gabl et al. |
| 5,617,434 A | 4/1997 | Tamura et al. |
| 5,624,587 A | 4/1997 | Otsuki et al. |
| 5,625,544 A | 4/1997 | Kowshik et al. |
| 5,627,848 A | 5/1997 | Fermann et al. |
| 5,633,750 A | 5/1997 | Nogiwa et al. |
| 5,633,885 A | 5/1997 | Galvanauskas et al. |
| 5,651,018 A | 7/1997 | Mehuys et al. |
| 5,656,186 A | 8/1997 | Mourou et al. |
| 5,663,731 A | 9/1997 | Theodoras, II et al. |
| 5,665,942 A | 9/1997 | Williams et al. |
| 5,670,067 A | 9/1997 | Koide et al. |
| 5,677,769 A | 10/1997 | Bendett |
| 5,682,262 A * | 10/1997 | Wefers et al. ............... 359/305 |
| 5,689,361 A | 11/1997 | Damen et al. |
| 5,689,519 A | 11/1997 | Fermann et al. |
| 5,696,782 A | 12/1997 | Harter et al. |
| 5,701,319 A | 12/1997 | Fermann |
| 5,703,639 A | 12/1997 | Farrier et al. |
| 5,710,424 A | 1/1998 | Theodoras, II et al. |
| 5,720,894 A | 2/1998 | Neev et al. |
| 5,726,855 A | 3/1998 | Mourou et al. |
| 5,739,933 A | 4/1998 | Dembeck et al. |
| 5,770,864 A | 6/1998 | Dlugos |
| 5,771,253 A | 6/1998 | Chang-Hasnain et al. |
| 5,778,016 A | 7/1998 | Sucha et al. |
| 5,786,117 A | 7/1998 | Hoshi et al. |
| 5,788,688 A | 8/1998 | Bauer et al. |
| 5,790,574 A | 8/1998 | Rieger et al. |
| 5,815,519 A | 9/1998 | Aoshima et al. |
| 5,818,630 A | 10/1998 | Fermann et al. |
| 5,847,863 A * | 12/1998 | Galvanauskas et al. ... 359/341.3 |
| 5,862,287 A | 1/1999 | Stock et al. |
| 5,862,845 A | 1/1999 | Chin et al. |
| 5,867,304 A | 2/1999 | Galvanauskas et al. |
| 5,875,408 A | 2/1999 | Bendett et al. |
| 5,880,823 A | 3/1999 | Lu |
| 5,880,877 A | 3/1999 | Fermann et al. |
| 5,898,485 A | 4/1999 | Nati, Jr. |
| 5,907,157 A | 5/1999 | Yoshioka et al. |
| 5,923,686 A | 7/1999 | Fermann et al. |
| 5,929,430 A | 7/1999 | Yao et al. |
| 5,933,271 A | 8/1999 | Waarts et al. |
| 5,936,716 A | 8/1999 | Pinsukanjana et al. |
| 6,014,249 A | 1/2000 | Fermann et al. |
| 6,020,591 A | 2/2000 | Harter et al. |
| 6,034,975 A | 3/2000 | Harter et al. |
| 6,041,020 A | 3/2000 | Caron et al. |
| 6,061,373 A | 5/2000 | Brockman et al. |
| 6,075,588 A | 6/2000 | Pinsukanjana et al. |
| 6,099,522 A | 8/2000 | Knopp et al. |
| 6,122,097 A | 9/2000 | Weston et al. |
| 6,134,003 A | 10/2000 | Tearney et al. |
| 6,168,590 B1 | 1/2001 | Neev |
| 6,172,611 B1 | 1/2001 | Hussain et al. |
| 6,175,437 B1 | 1/2001 | Diels et al. |
| 6,179,421 B1 | 1/2001 | Pang |
| 6,181,463 B1 | 1/2001 | Galvanauskas et al. |
| 6,198,568 B1 | 3/2001 | Galvanauskas et al. |
| 6,198,766 B1 | 3/2001 | Schuppe et al. |
| 6,208,458 B1 | 3/2001 | Galvanauskas et al. |
| 6,228,748 B1 | 5/2001 | Anderson et al. |
| 6,246,816 B1 | 6/2001 | Moore et al. |
| 6,249,630 B1 | 6/2001 | Stock et al. |
| 6,256,328 B1 | 7/2001 | Delfyett et al. |
| 6,269,108 B1 | 7/2001 | Tabirian et al. |
| 6,271,650 B1 | 8/2001 | Massie et al. |
| 6,275,250 B1 | 8/2001 | Sanders et al. |
| 6,281,471 B1 | 8/2001 | Smart |
| 6,290,910 B1 | 9/2001 | Chalk |
| 6,303,903 B1 | 10/2001 | Liu |
| 6,314,115 B1 | 11/2001 | Delfyett et al. |
| 6,327,074 B1 | 12/2001 | Bass et al. |
| 6,327,282 B2 | 12/2001 | Hammons et al. |
| 6,330,383 B1 | 12/2001 | Cai et al. |
| 6,334,011 B1 | 12/2001 | Galvanauskas et al. |
| 6,335,821 B1 | 1/2002 | Suzuki et al. |
| 6,340,806 B1 | 1/2002 | Smart et al. |
| RE37,585 E | 3/2002 | Mourou et al. |
| 6,355,908 B1 | 3/2002 | Tatah et al. |
| 6,359,681 B1 | 3/2002 | Housand et al. |
| 6,366,395 B1 | 4/2002 | Drake et al. |
| 6,370,171 B1 | 4/2002 | Horn et al. |
| 6,371,469 B1 | 4/2002 | Gray |
| 6,396,317 B1 | 5/2002 | Roller et al. |
| 6,400,871 B1 | 6/2002 | Minden |
| 6,407,363 B2 | 6/2002 | Dunsky et al. |
| 6,418,154 B1 | 7/2002 | Kneip et al. |
| 6,421,169 B1 | 7/2002 | Bonnedal et al. |
| 6,425,912 B1 | 7/2002 | Knowlton |
| 6,433,760 B1 | 8/2002 | Vaissie et al. |
| 6,463,314 B1 | 10/2002 | Haruna |
| 6,485,413 B1 | 11/2002 | Boppart et al. |
| 6,486,435 B1 | 11/2002 | Beyer et al. |
| 6,496,099 B2 | 12/2002 | Wang et al. |
| 6,501,590 B2 | 12/2002 | Bass et al. |
| 6,522,460 B2 | 2/2003 | Bonnedal et al. |
| 6,522,674 B1 | 2/2003 | Niwano et al. |

(56) References Cited

U.S. PATENT DOCUMENTS

| | | | |
|---|---|---|---|
| 6,525,873 B2 | 2/2003 | Gerrish et al. |
| 6,526,085 B2 | 2/2003 | Vogler et al. |
| 6,529,319 B2 | 3/2003 | Youn et al. |
| 6,547,453 B1 | 4/2003 | Stummer et al. |
| 6,549,547 B2 | 4/2003 | Galvanauskas et al. |
| 6,552,301 B2 | 4/2003 | Herman et al. |
| 6,562,698 B2 | 5/2003 | Manor |
| 6,567,431 B2 | 5/2003 | Tabirian et al. |
| 6,570,704 B2 | 5/2003 | Palese |
| 6,574,024 B1 | 6/2003 | Liu |
| 6,576,917 B1 | 6/2003 | Silfvast |
| 6,580,553 B2 | 6/2003 | Kim et al. |
| 6,592,574 B1 | 7/2003 | Shimmick et al. |
| 6,614,565 B1 | 9/2003 | Klug et al. |
| 6,621,040 B1 | 9/2003 | Perry et al. |
| 6,621,045 B1 | 9/2003 | Liu et al. |
| 6,654,161 B2 | 11/2003 | Bass et al. |
| 6,661,568 B2 | 12/2003 | Hollemann et al. |
| 6,661,816 B2 | 12/2003 | Delfyett et al. |
| 6,661,820 B1 | 12/2003 | Camilleri et al. |
| 6,671,298 B1 | 12/2003 | Delfyett et al. |
| 6,681,079 B1 | 1/2004 | Maroney |
| 6,690,686 B2 | 2/2004 | Delfyett et al. |
| 6,697,402 B2 | 2/2004 | Crawford |
| 6,697,408 B2 | 2/2004 | Kennedy et al. |
| 6,700,094 B1 | 3/2004 | Kuntze |
| 6,706,036 B2 | 3/2004 | Lai |
| 6,706,998 B2 | 3/2004 | Cutler |
| 6,723,991 B1 | 4/2004 | Sucha et al. |
| 6,728,273 B2 | 4/2004 | Perry |
| 6,728,439 B2 | 4/2004 | Weisberg et al. |
| 6,735,229 B1 | 5/2004 | Delfyett et al. |
| 6,738,144 B1 | 5/2004 | Dogariu |
| 6,738,408 B2 | 5/2004 | Abedin |
| 6,744,552 B2 | 6/2004 | Scalora et al. |
| 6,744,555 B2 | 6/2004 | Galvanauskas et al. |
| 6,760,356 B2 | 7/2004 | Erbert et al. |
| 6,774,869 B2 | 8/2004 | Biocca et al. |
| 6,782,207 B1 | 8/2004 | Efimov |
| 6,785,303 B1 | 8/2004 | Holzwarth et al. |
| 6,787,733 B2 | 9/2004 | Lubatschowski et al. |
| 6,787,734 B2 | 9/2004 | Liu |
| 6,801,318 B2 * | 10/2004 | Fu et al. ............ 356/450 |
| 6,801,551 B1 | 10/2004 | Delfyett et al. |
| 6,801,557 B2 | 10/2004 | Liu |
| 6,807,375 B2 | 10/2004 | Dogariu |
| 6,815,638 B2 | 11/2004 | Liu |
| 6,819,694 B2 | 11/2004 | Jiang et al. |
| 6,819,702 B2 | 11/2004 | Sverdlov et al. |
| 6,819,837 B2 | 11/2004 | Li et al. |
| 6,822,187 B1 | 11/2004 | Hermann et al. |
| 6,822,251 B1 | 11/2004 | Arenberg et al. |
| 6,829,517 B2 | 12/2004 | Cheng et al. |
| 6,834,134 B2 | 12/2004 | Brennan, III et al. |
| 6,836,703 B2 | 12/2004 | Wang et al. |
| 6,878,900 B2 | 4/2005 | Corkum et al. |
| 6,885,683 B1 | 4/2005 | Fermann et al. |
| 6,887,804 B2 | 5/2005 | Sun et al. |
| 6,897,405 B2 | 5/2005 | Cheng et al. |
| 6,915,040 B2 | 7/2005 | Willner et al. |
| 6,917,631 B2 | 7/2005 | Richardson et al. |
| 6,928,490 B1 | 8/2005 | Bucholz et al. |
| 6,994,703 B2 | 2/2006 | Wang et al. |
| 7,001,373 B2 | 2/2006 | Clapham et al. |
| 7,002,733 B2 | 2/2006 | Dagenais et al. |
| 7,068,408 B2 | 6/2006 | Sakai |
| 7,072,101 B2 | 7/2006 | Kapteyn et al. |
| 7,088,756 B2 | 8/2006 | Fermann et al. |
| 7,095,772 B1 | 8/2006 | Delfyett et al. |
| 7,097,640 B2 | 8/2006 | Wang et al. |
| 7,116,688 B2 | 10/2006 | Sauter et al. |
| 7,143,769 B2 | 12/2006 | Stoltz et al. |
| 7,217,266 B2 | 5/2007 | Anderson et al. |
| 7,220,255 B2 | 5/2007 | Lai |
| 7,233,607 B2 | 6/2007 | Richardson et al. |
| 7,257,302 B2 | 8/2007 | Fermann et al. |
| 7,289,707 B1 | 10/2007 | Chavez-Pirson et al. |
| 7,332,234 B2 | 2/2008 | Levinson et al. |
| 7,349,589 B2 | 3/2008 | Temelkuran et al. |
| 7,367,969 B2 | 5/2008 | Stoltz et al. |
| 7,413,565 B2 | 8/2008 | Wang et al. |
| 7,414,780 B2 | 8/2008 | Fermann et al. |
| 7,444,049 B1 | 10/2008 | Kim et al. |
| 7,505,196 B2 | 3/2009 | Nati et al. |
| 7,518,788 B2 | 4/2009 | Fermann et al. |
| 7,674,719 B2 | 3/2010 | Li et al. |
| 7,675,674 B2 | 3/2010 | Bullington et al. |
| 7,728,967 B2 | 6/2010 | Ochiai et al. |
| 7,751,118 B1 | 7/2010 | Di Teodoro et al. |
| 7,759,607 B2 | 7/2010 | Chism, II |
| 7,773,216 B2 | 8/2010 | Cheng et al. |
| 7,773,294 B2 | 8/2010 | Brunet et al. |
| 7,787,175 B1 | 8/2010 | Brennan, III et al. |
| 7,792,408 B2 | 9/2010 | Varming |
| 7,822,347 B1 | 10/2010 | Brennan, III et al. |
| 7,963,958 B2 | 6/2011 | Stoltz et al. |
| 2001/0009250 A1 | 7/2001 | Herman et al. |
| 2001/0021294 A1 | 9/2001 | Cai et al. |
| 2001/0046243 A1 | 11/2001 | Schie |
| 2002/0003130 A1 | 1/2002 | Sun et al. |
| 2002/0051606 A1 | 5/2002 | Takushima et al. |
| 2002/0071454 A1 | 6/2002 | Lin |
| 2002/0091325 A1 | 7/2002 | Ostrovsky |
| 2002/0097468 A1 | 7/2002 | Mecherle et al. |
| 2002/0097761 A1 | 7/2002 | Sucha et al. |
| 2002/0115273 A1 | 8/2002 | Chandra et al. |
| 2002/0118934 A1 | 8/2002 | Danziger et al. |
| 2002/0153500 A1 | 10/2002 | Fordahl et al. |
| 2002/0167581 A1 | 11/2002 | Cordingley et al. |
| 2002/0167974 A1 | 11/2002 | Kennedy et al. |
| 2002/0191901 A1 | 12/2002 | Jensen |
| 2003/0011782 A1 | 1/2003 | Tanno |
| 2003/0031410 A1 | 2/2003 | Schnitzer |
| 2003/0055413 A1 | 3/2003 | Altshuler et al. |
| 2003/0060808 A1 | 3/2003 | Wilk |
| 2003/0086647 A1 | 5/2003 | Willner et al. |
| 2003/0123496 A1 | 7/2003 | Broutin et al. |
| 2003/0142705 A1 | 7/2003 | Hackel et al. |
| 2003/0156605 A1 * | 8/2003 | Richardson et al. ............ 372/25 |
| 2003/0161365 A1 | 8/2003 | Perry et al. |
| 2003/0178396 A1 | 9/2003 | Naumov et al. |
| 2003/0205561 A1 | 11/2003 | Iso |
| 2003/0223689 A1 | 12/2003 | Koch et al. |
| 2003/0235381 A1 | 12/2003 | Hunt |
| 2004/0000942 A1 * | 1/2004 | Kapteyn et al. ............... 327/306 |
| 2004/0022695 A1 | 2/2004 | Simon et al. |
| 2004/0042061 A1 | 3/2004 | Islam et al. |
| 2004/0049552 A1 | 3/2004 | Motoyama et al. |
| 2004/0101001 A1 | 5/2004 | Bergmann et al. |
| 2004/0128081 A1 | 7/2004 | Rabitz et al. |
| 2004/0134894 A1 | 7/2004 | Gu et al. |
| 2004/0134896 A1 | 7/2004 | Gu et al. |
| 2004/0160995 A1 | 8/2004 | Sauter et al. |
| 2004/0226922 A1 | 11/2004 | Flanagan |
| 2004/0226925 A1 | 11/2004 | Gu et al. |
| 2004/0233944 A1 | 11/2004 | Dantus et al. |
| 2004/0263950 A1 | 12/2004 | Fermann et al. |
| 2005/0035097 A1 | 2/2005 | Stoltz |
| 2005/0036527 A1 | 2/2005 | Khazaei et al. |
| 2005/0038487 A1 | 2/2005 | Stoltz |
| 2005/0065502 A1 | 3/2005 | Stoltz |
| 2005/0067388 A1 | 3/2005 | Sun et al. |
| 2005/0074974 A1 | 4/2005 | Stoltz |
| 2005/0077275 A1 | 4/2005 | Stoltz |
| 2005/0105865 A1 | 5/2005 | Fermann et al. |
| 2005/0107773 A1 | 5/2005 | Bergt et al. |
| 2005/0111073 A1 | 5/2005 | Pan et al. |
| 2005/0154380 A1 | 7/2005 | DeBenedictis et al. |
| 2005/0163426 A1 | 7/2005 | Fermann et al. |
| 2005/0167405 A1 | 8/2005 | Stoltz et al. |
| 2005/0171518 A1 | 8/2005 | Stoltz et al. |
| 2005/0175280 A1 | 8/2005 | Nicholson |
| 2005/0177143 A1 | 8/2005 | Bullington et al. |
| 2005/0213630 A1 | 9/2005 | Mielke et al. |

(56) References Cited

U.S. PATENT DOCUMENTS

| | | |
|---|---|---|
| 2005/0215985 A1 | 9/2005 | Mielke et al. |
| 2005/0218122 A1 | 10/2005 | Yamamoto et al. |
| 2005/0225846 A1 | 10/2005 | Nati et al. |
| 2005/0226278 A1 | 10/2005 | Gu et al. |
| 2005/0226286 A1 | 10/2005 | Liu et al. |
| 2005/0226287 A1 | 10/2005 | Shah et al. |
| 2005/0253482 A1 | 11/2005 | Kapps et al. |
| 2005/0265407 A1 | 12/2005 | Braun et al. |
| 2005/0271094 A1 | 12/2005 | Miller et al. |
| 2005/0274702 A1 | 12/2005 | Deshi |
| 2006/0016891 A1 | 1/2006 | Giebel et al. |
| 2006/0030951 A1 | 2/2006 | Davlin et al. |
| 2006/0050750 A1 | 3/2006 | Barty |
| 2006/0056480 A1 | 3/2006 | Mielke et al. |
| 2006/0064079 A1 | 3/2006 | Stoltz et al. |
| 2006/0067604 A1 | 3/2006 | Bull et al. |
| 2006/0084957 A1 | 4/2006 | Delfyett et al. |
| 2006/0093265 A1 | 5/2006 | Jia et al. |
| 2006/0120418 A1 | 6/2006 | Harter et al. |
| 2006/0126679 A1 | 6/2006 | Brennan, III et al. |
| 2006/0131288 A1 | 6/2006 | Sun et al. |
| 2006/0159137 A1 | 7/2006 | Shah |
| 2006/0187974 A1 | 8/2006 | Dantus |
| 2006/0209908 A1 | 9/2006 | Pedersen et al. |
| 2006/0210275 A1 | 9/2006 | Vaissie et al. |
| 2006/0221449 A1 | 10/2006 | Glebov et al. |
| 2006/0249816 A1 | 11/2006 | Li et al. |
| 2006/0250025 A1 | 11/2006 | Kitagawa et al. |
| 2006/0268949 A1 | 11/2006 | Gohle et al. |
| 2007/0025728 A1 | 2/2007 | Nakazawa et al. |
| 2007/0047965 A1 | 3/2007 | Liu et al. |
| 2007/0064304 A1 | 3/2007 | Brennan, III et al. |
| 2007/0098025 A1 | 5/2007 | Hong et al. |
| 2007/0106416 A1 | 5/2007 | Griffiths et al. |
| 2007/0121686 A1 | 5/2007 | Vaissie et al. |
| 2007/0196048 A1 | 8/2007 | Galvanauskas et al. |
| 2007/0229939 A1 | 10/2007 | Brown et al. |
| 2007/0253455 A1 | 11/2007 | Stadler et al. |
| 2007/0273960 A1 | 11/2007 | Fermann et al. |
| 2008/0050078 A1 | 2/2008 | Digonnet et al. |
| 2008/0058781 A1 | 3/2008 | Langeweyde et al. |
| 2008/0232407 A1 | 9/2008 | Harter et al. |
| 2008/0240184 A1 | 10/2008 | Cho et al. |
| 2009/0020511 A1 | 1/2009 | Kommera et al. |
| 2009/0219610 A1 | 9/2009 | Mourou et al. |
| 2009/0244695 A1 | 10/2009 | Marcinkevicius et al. |
| 2009/0245302 A1 | 10/2009 | Baird et al. |
| 2009/0257464 A1 | 10/2009 | Dantus et al. |
| 2009/0273828 A1 | 11/2009 | Waarts et al. |
| 2009/0290151 A1 | 11/2009 | Agrawal et al. |
| 2009/0297155 A1 | 12/2009 | Weiner et al. |
| 2010/0013036 A1 | 1/2010 | Carey |
| 2010/0040095 A1 | 2/2010 | Mielke et al. |
| 2010/0118899 A1 | 5/2010 | Peng et al. |
| 2010/0142034 A1 | 6/2010 | Wise et al. |
| 2010/0181284 A1 | 7/2010 | Lee et al. |

FOREIGN PATENT DOCUMENTS

| | | |
|---|---|---|
| EP | 1462831 | 9/2004 |
| JP | 8171103 | 7/1996 |
| JP | 11189472 | 7/1999 |
| JP | 2003181661 | 7/2003 |
| JP | 2003344883 | 12/2003 |
| JP | 2005174993 | 6/2005 |
| WO | WO9428972 | 12/1994 |
| WO | WO2004105100 | 12/2004 |
| WO | WO2004114473 | 12/2004 |
| WO | WO2005018060 | 2/2005 |
| WO | WO2005018061 | 2/2005 |
| WO | WO2005018062 | 2/2005 |
| WO | WO2005018063 | 2/2005 |
| WO | WO2007034317 | 3/2007 |

OTHER PUBLICATIONS

Anastassiou et al., "Photonic Bandgap Fibers Exploiting Omnidirectional Reflectivity Enable Flexible Delivery of Infrared Lasers for Tissue Cutting," Proceedings of the SPIE—the International Society for Optical Engineering, SPIE, US, vol. 5317, No. 1, Jan. 1, 2004, pp. 29-38, XP002425586 ISSN: 0277-786X.

Benoit, G. et al., "Dynamic All-optical Tuning of Transverse Resonant Cavity Modes in Photonic Bandgap Fibers, "Optics Letters, vol. 30, No. 13, Jul. 1, 2005, pp. 1620-1622.

Chen, L. et al., "Ultrashort Optical Pulse Interaction with Fibre Gratings and Device Applications," 1997, Canaga, located at http://www.collectionscanada.ca/obj/s4/f2/dsk2/ftp04/mq29402.pfd.

Chen, X. et al., "Highly Birefringent Hollow-core Photonic Bandgap Fiber," Optics Express, vol. 12, No. 16, Aug. 9, 2004, pp. 3888-3893.

Chen, Y. et al., "Dispersion-Managed Mode Locking", Journal of the Optical Society of America B, Nov. 1999, pp. 1999-2004, vol. 16, No. 11, Optical Society of America.

Dasgupta, S. et al., "Design of Dispersion-Compensating Bragg Fiber with an Ultrahigh Figure of Merit," Optics Letters, Aug. 1, 2005, vol. 30, No. 15, Optical Society of America.

De Matos et al., "Multi-kilowatt, Picosecond Pulses from an All-fiber Chirped Pulse Amplification System Using Air-core Photonic Bandgalp Fiber", Lasers and Electro-optics, 2004, (CLEO), Conference on San Francisco, CA USA, May 20-21, 2004, Piscataway, NJ, USA, IEEE, Vol. May 17, 2004, pp. 973-974, XP010745448 ISBN: 978-1-55752-777-6.

De Matos, C.J.S. et al., "All-fiber Chirped Pulse Amplification using Highly-dispersive Air-core Photonic Bandgap Fiber," Nov. 3, 2003, Optics Express, pp. 2832-2837, vol. 11, No. 22.

Delfyett, P. et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.

Eggleton, et al., "Electrically Tunable Power Efficient Dispersion Compensating Fiber Bragg Grating," IEEE Photonics Technology Letters, vol. 11, No. 7, pp. 854-856, Jul. 1999.

Engeness et al., "Dispersion Tailoring and Compensation by Modal Interations in Omniguide Fibers," Optics Express, May 19, 2003, pp. 1175-1196, vol. 11, No. 10.

Fink et al., "Guiding Optical Light in Air Using an All-Dielectric Structure," Journal of Lightwave Technology, Nov. 1999, pp. 2039-2041, vol. 17, No. 11.

Folkenberg, J.R., et al., "Broadband Single-polarization Photonic Crystal Fiber," Optics Letters, vol. 30, No. 12, Jun. 15, 2005, pp. 1446-1448.

Folkenberg, J.R., et al., "Polarization Maintaining Large Mode Area Photonic Crystal Fiber," Optics Express vol. 12, No. 5, Mar. 8, 2004, pp. 956-960.

Futami, F., et al., "Wideband Fibre Dispersion Equalisation up to Fourth-order for Long-distance Sub-picosecond Optical Pulse Transmission," Electronics Letters, vol. 35, No. 25, Dec. 9, 1999.

Galvanauskas, A. et al., "Chirped-pulse-amplification Circuits for Fiber Amplifiers, Based on Chirped-period Quasi-phase, matching gratings", Optics Letters, Nov. 1, 1998, p. 1695-1697, vol. 23, No. 21, Optical Society of America.

Hartl et al., "In-line high energy Yb Fiber Laser Based Chirped Pulse Amplifier System", Laser and Electro-Optics, 2004, (CLEO) Conference of San Francisco, CA USA May 20-21, 2004, Piscataway, NJ, USA, IEEE, vol. 1, May 17, 2004, pp. 563-565, XP010745382, ISBN: 978-1-55752-777-6.

Hellstrom, E. et al., "Third-order Dispersion Compensation Using a Phase Modulator", Journal of Lightwave Technology, vol. 21, No. 5, pp. 1188-1197, May 2003.

Heritage, J. P. et al., "Picosecond Pulse Shaping by Spectral Phase and Amplitude Manipulation," Optics Letters, vol. 10, No. 12, pp. 609-611, Dec. 1985.

Heritage, J.P. et al., "Spectral Windowing of Frequency-Modulated Optical Pulses in a Grating Compressor," Applied Physics Letters, vol. 47, No. 2, pp. 87-89, Jul. 15, 1985.

Hill, K. et al., "Fiber Bragg Grating Technology Fundamentals and Overview," Journal of Lightwave Technology, Aug. 1997, vol. 15, No. 8, pp. 1263-1276.

(56) References Cited

OTHER PUBLICATIONS

Ibanescu et al., "Analysis of Mode Structure in Hollow Dielctric Waveguide Fibers,"Physical Review E 67, 2003, The American Physical Society.
Jiang, et al., "Fully Dispersion Compensated ~500 fs Pulse Transmission Over 50 km Single Mode Fiber," Optics Letters, vol. 30, No. 12, pp. 1449-1451, Jun. 15, 2005.
Jiang, et al., "Fully Dispersion Compensated ~500 fs Pulse Transmission Over 50 km Single Mode Fiber," Purdue University ECE Annual Research Summary, Jul. 1, 2004-Jun. 30, 2005.
Killey, et al., "Electronic Dispersion Compensation by Signal Predistortion Using Digital Processing and a Dual-Drive Mach-Zehnder Modulator," IEEE Photonics Technology Letters, vol. 17, No. 3, pp. 714-716, Mar. 2005.
Kim, K. et al., "1.4kW High Peak Power Generation from an All Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.
Koechner, "Solid State Laser Engineering", Oct. 29, 1999, Section 5.5, pp. 270-277, 5th Edition, Springer.
Kwon, et al., "Tunable Dispersion Slope Compensator Using a Chirped Fiber Bragg Grating Tuned by a Fan-shaped Thin Metallic Heat Channel," IEEE Photonics Technology Letters, vol. 18, No. 1, pp. 118-120, Jan. 1, 2006.
Kyungbum, Kim et al., "1.4kW High Peak Power Generation from an all Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.
Levy et al., "Engineering Space-Variant Inhomogeneous Media for Polarization Control," Optics Letters, Aug. 1, 2004, pp. 1718-1720, vol. 29, No. 15, Optical Society of America.
Liao, Kai-Hsiu et al., "Large-aperture Chirped Volume Bragg Grating Based Fiber CPA System,"Optics Express, Apr. 16, 2007, vol. 15, No. 8, pp. 4876-4882.
Limpert et al., "All Fiber Chiped-Pulse Amplification System Based on Compression in Air-Guiding Photonic Bandgap Fiber", Optics Express, Dec. 1, 2003, vol. 11, No. 24, pp. 3332-3337.
Lo, S. et al., "Semiconductor Hollow Optical Waveguides Formed by Omni-directional Reflectors", Optics Express, vol. 12, No. 26, Dec. 27, 2004, pp. 6589-6593.
Malinowski A. et al., "Short Pulse High Power Fiber Laser Systems," Proceedings of the 2005 Conference on Lasers and Electro-Optics (CLEO), Paper No. CThG3, pp. 1647-1649, May 26, 2005.
Mehier-Humbert, S. et al., "Physical Methods for Gene Transfer: Improving the Kinetics of Gene Delivery Into Cells," Advanced Drug Delivery Reviews, vol. 57, pp. 733-753, 2005.
Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.
Nibbering, E.T.J., et al. "Spectral Determination of the Amplitude and the Phase of Intense Ultrashort Optical Pulses," Journal Optical Society of America B, vol. 13, No. 2, pp. 317-329, Feb. 1996.
Nicholson, J. et al., "Propagation of Femotsecond Pulses in Large-mode-area, Higher-order-mode Fiber," Optics Letters, vol. 31, No. 21, 2005, pp. 3191-3193.
Nishimura et al., "In Vivo Manipulation of Biological Systems with Femtosecond Laser Pulses," Proc. SPIE 6261, 62611J, pp. 1-10, 2006.
Noda, J. et al., "Polarization-maintaining Fibers and Their Applications", Journal of Lightwave Technology, vol. Lt-4, No. 8 Aug. 1986, pp. 1071-1089.
Palfrey et al., "Generation of 16-FSEC Frequency-tunable Pulses by Optical Pulse compression" Optics Letters, OSA, Optical Society of america, Washington, DC, USA, vol. 10, No. 11, Nov. 1, 1985, pp. 562-564, XP000710358 ISSN: 0146-9592.
Pelusi, M. et al., "Electrooptic Phase Modulation of Stretched 250-fs Pulses for Suppression of Third-Order Fiber Disperson in Transmission", IEEE Photonics Technology Letters, vol. 11, No. 11, Nov. 1999, pp. 1461-1463.
Pelusi, M. D., et al., "Phase Modulation of Stretched Optical Pulses for Suppression of Third-order Dispersion Effects in fibre Transmission," Electronics Letters, vol. 34, No. 17, pp. 1675-1677, Aug. 20, 1998.
Price et al., "Advances in High Power, Short Pulse, Fiber Laser Systems and Technology", Photonics West 2005, San Jose, California, Jan. 2005, pp. 5709-3720.
Price et al., "Advances in High Power, Short Pulse, Fiber Laser Systems and Technology", Proceedings of SPIE—vol. 5709, Fiber Lasers II: Technology, Systems, and Applications, Apr. 2005, pp. 184-192.
Ramachandran, S., et al., "High-power Amplification in a 2040-μm2 Higher Order Mode," SPIE Photonics West 2007, Post-deadline.
Resan et al., "Dispersion-Managed Semiconductor Mode-Locked Ring Laser", Optics Letters, Aug. 1, 2003, pp. 1371-1373, vol. 28, No. 15, Optical Society of America.
Schreiber, T., et al., "Design and High Power Operation of a Stress-induced single Polarization Single-transverse Mode LMA Yb-doped Photonic Crystal Fiber," Fiber Lasers III: Technology, Systems, and Applications, Andrew J.W. Brown, Johan Nilsson, Donald J. Harter, Andreas Tünnermann, eds., Proc. of SPIE, vol. 6102, pp. 61020C-1-61020C-9, 2006.
Schreiber, T., et al., "Stress-induced Single-polarization Single-transverse Mode Photonic Crystal Fiber with Low Nonlinearity," Optics Express, vol. 13, No. 19, Sep. 19, 2005, pp. 7621-7630.
Siegman, "Unstable Optical Resonators", Applied Optics, Feb. 1974, pp. 353-367, vol. 13, No. 2.
Stevenson et al., Femtosecond Optical Transfection of Cells: Viability and Efficiency, Optics Express, vol. 14, No. 16, pp. 7125-7133, Aug. 7, 2006.
Stock et al., "Chirped Pulse Amplification in an Erbium-doped fiber Oscillator/Erbium-doped Fiber Amplifier System", Optics Communications, North-Holland Publishing Co., Amsterdam, NL, vol. 106, No. 4/5/06, Mar. 15, 1994, pp. 249-252, XP000429901, ISSN: 0030-4018.
Strickland et al., "Compression of Amplified Chirped Optical Pulses", Optics Communications, North-Holland Publishing Co., Amersterdam, NL, vol. 56, No. 3, Dec. 1, 1985, pp. 219-221, XP024444933 ISSN: 0030-4018 (retrieved on Dec. 11, 1985).
Temelkuran, B. et al., "Wavelength-scalable Hollow Optical Fibres with Large Photonic Bandgaps for CO2 Laser Transmission," Nature, Dec. 12, 2002, pp. 650-653.
Thurston, R.N. et al., "Analysis of Picosecond Pulse Shape Synthesis by Spectral Masking in a Grating Pulse Compressor," IEEE Journal of Quantum Electronics, vol. EQ-22, No. 5, pp. 682-696, May 1986.
Tirlapur et al., "Targeted Transfection by Femtosecond Laser," Nature Publishing Group, vol. 418, pp. 290-291, Jul. 18, 2002.
Tsai et al., "Ultrashort Pulsed Laser Light," Optics & Photonics News, pp. 25-29, Jul. 2004.
Vaissie et al., "Desktop Ultra-Short Pulse Laser at 1552 nm,"Ultrashort Pulse Laser Materials Interaction Workshop (Raydiance)—Directed Energy Professional Society (DEPS), Sep. 28, 2006.
Weiner, A.M. et al., "Synthesis of Phase-coherent, Picosecond Optical Square Pulses," Optics Letters, vol. 11, No. 3, pp. 153-155, Mar. 1986.
Weiner, A.M., "Femtosecond Optical Pulse Shaping and Processing," Prog. Quant. Electr. 1995, vol. 19, pp. 161-237, 1995.
Weiner, A.M., "High-resolution femtosecond Pulse Shaping," Journal of the Optical Society of America B. vol. 5, No. 8, pp. 1563-1572, Aug. 1988.
Wells, D.J., "Gene Therapy Progress and Prospects: electroporation and Other Physical Methods," Gene Therapy, Nature Publishing Group, vol. 11, pp. 1363-1369, Aug. 5, 2004, (http://www.nature.com/gt).
White, W.E., et al., "Compensation of Higher-order Frequency-dependent Phase Terms in Chirped-pulse Amplification Systems," Optics Letters, vol. 18, No. 16, pp. 1343-1345, Aug. 15, 1993.
Yamakawa et al., "1 Hz, 1 ps, terawatt Nd: glass laser", Optics Communications, North-Holland Publishing Co. Amsterdam, NL, vol. 112, No. 1-2, Nov. 1, 1994, pp. 37-42, XP024424285.
Yan et al., Ultrashort Pulse Measurement Using Interferometric Autocorrelator Based on Two-photon-absorbtion Detector at 1.55μm

(56) References Cited

OTHER PUBLICATIONS

Wavelength Region., 2005, Proceedings of SPIE vol. 5633, Advanced Materials and Devices for Sensing and Imaging II, pp. 424-429.

Yeh, et al. "Theory of Bragg Fiber", Journal of the Optical Society America, Sep. 1978, pp. 1196, vol. 68, No. 9., pp. 1196-1201.

Yi, Y. et al., "Sharp Bending of On-Chip silicon Bragg Cladding Waveguide With Light Guiding on Low Index Core Materials", IEEE Journal of Selected Topics in Quantum Electronics, vol. 12, No. 6, Nov./Dec. 2006, pp. 1345-1348.

Yi, Y., et al., "On-chip Si-based Bragg Cladding Waveguide with High Index Contrast Bilayers", Optics Express, vol. 12, No. 20, Oct. 4, 2004, pp. 4775-4780.

Yin, D. et al., "Integrated Arrow Waveguides with Hollow Cores", Optics Express, vol. 12, No. 12, Jun. 14, 2004, pp. 2710-2715.

Zhou, S. et al., "Compensation of nonlinear Phase Shifts with Third-order Dispersion in Short-pulse Fiber Amplifiers," Optics Express, vol. 13, No. 13, pp. 4869-2877, Jun. 27, 2005.

Office Action mailed Sep. 9, 2011 in Japanese patent application No. 2007-545521 filed Dec. 1, 2005.

International Search Report mailed Nov. 15, 2006 in PCT patent application No. PCT/US2005/043547 filed Dec. 1, 2005.

Extended European Search Report mailed Feb. 4, 2010 in European patent application No. 05826140.5 filed Dec. 1, 2005.

Office Action mailed Aug. 9, 2007 in U.S. Appl. No. 11/112,256, filed Apr. 22, 2005.

Office Action mailed Mar. 9, 2006 in U.S. Appl. No. 10/849,585, filed May 19, 2004.

Office Action mailed Mar. 9, 2006 and a Notice of Allowance mailed Sep. 19, 2006 in U.S. Appl. No. 10/916,367, filed Aug. 11, 2004.

Office Action mailed Jun. 14, 2006 in U.S. Appl. No. 10/916,368, filed Aug. 11, 2004.

Notice of Allowance mailed Nov. 1, 2007 in U.S. Appl. No. 10/916,365, filed Aug. 11, 2004.

Office Action mailed Jul. 31, 2006 in U.S. Appl. No. 10/850,325, filed May 19, 2004.

Office Action mailed Sep. 22, 2006 and a Notice of Allowance mailed May 23, 2007 in U.S. Appl. No. 10/916,017, filed Aug. 11, 2004.

Office Actions mailed Sep. 14, 2005 and Mar. 1, 2006 in U.S. Appl. No. 10/849,586, filed May 19, 2004.

Office Action mailed Mar. 9, 2006 in U.S. Appl. No. 10/849,587, filed May 19, 2004.

Office Actions mailed Oct. 3, 2007; Jun. 11, 2008; and Apr. 6, 2009 in U.S. Appl. No. 10/916,364, filed Aug. 11, 2004.

Final Office Action mailed Mar. 15, 2006 and Office Actions mailed Sep. 28, 2005 and Jun. 6, 2006 in U.S. Appl. No. 10/916,366, filed Aug. 11, 2004.

Notice of Allowance mailed Jun. 16, 2006 in U.S. Appl. No. 10/850,326, filed May 19, 2004.

Office Action mailed Jan. 17, 2007 in U.S. Appl. No. 10/850,478, filed May 19, 2004.

Office Action mailed Jan. 27, 2006 and a Notice of Allowance mailed May 26, 2006 in U.S. Appl. No. 10/957,271, filed Oct. 1, 2004.

Office Action mailed Jan. 12, 2007 in U.S. Appl. No. 10/957,272, filed Oct. 1, 2004.

Notice of Allowance mailed Apr. 30, 2008 in U.S. Appl. No. 11/054,335, filed Feb. 8, 2005.

Office Action mailed Mar. 9, 2006 in U.S. Appl. No. 11/057,867, filed Feb. 13, 2005.

Office Action mailed May 25, 2007 in U.S. Appl. No. 11/057,868, filed Feb. 13, 2005.

International Search Report mailed Sep. 29, 2005 in PCT patent application No. PCT/US2004/015835 filed May 19, 2004.

International Search Report mailed Apr. 7, 2005 in PCT patent application No. PCT/US2004/025989 filed Aug. 11, 2004.

Office Action mailed Feb. 11, 2009 in U.S. Appl. No. 10/568,135, filed Oct. 19, 2006.

International Search Report mailed Feb. 9, 2005 in PCT patent application No. PCT/US2004/025991 filed Aug. 11, 2004.

International Search Report mailed Feb. 15, 2006 in PCT patent application No. PCT/US2004/025992 filed Aug. 11, 2004.

International Search Report mailed Feb. 9, 2005 in PCT patent application No. PCT/US2004/025990 filed Aug. 11, 2004.

International Search Report mailed May 10, 2005 in PCT patent application No. PCT/US2004/015913 filed Aug. 11, 2004.

Office Actions mailed Oct. 6, 2006 and Mar. 27, 2007 in U.S. Appl. No. 11/229,302, filed Sep. 15, 2005.

Office Action mailed Mar. 3, 2010 and a Final Office Action mailed Mar. 9, 2011 in U.S. Appl. No. 11/224,867, filed Sep. 12, 2005.

Office Actions mailed Aug. 7, 2006 and Sep. 7, 2006 and a Final Office Action mailed Jan. 8, 2007 in U.S. Appl. No. 11/233,634, filed Sep. 22, 2005.

Office Action mailed Apr. 30, 2007 in U.S. Appl. No. 11/281,144, filed Nov. 16, 2005.

Office Actions mailed May 8, 2008; Jul. 2, 2009; and Aug. 3, 2010 in U.S. Appl. No. 11/489,792, filed Jul. 19, 2006.

Office Actions mailed Aug. 22, 2007 and Mar. 4, 2008 in U.S. Appl. No. 11/291,609, filed Nov. 30, 2005.

Office Action mailed Mar. 21, 2006 in U.S. Appl. No. 11/333,824, filed Jan. 17, 2006.

Office Actions mailed Oct. 7, 2008; Apr. 1, 2009; and Nov. 24, 2009 in U.S. Appl. No. 11/391,936, filed Mar. 28, 2006.

Office Actions mailed Dec. 24, 2008; Jun. 24, 2009; and Dec. 8, 2009 in U.S. Appl. No. 11/440,607, filed May 24, 2006.

Office Action mailed Oct. 30, 2008; Final Office Action mailed Apr. 27, 2009; and a Notice of Allowance mailed Apr. 28, 2010 in U.S. Appl. No. 11/563,957, filed Nov. 28, 2006.

Office Action mailed Dec. 30, 2009 and a Notice of Allowance mailed Jun. 30, 2011 in U.S. Appl. No. 12/077,658, filed Mar. 19, 2008.

Office Actions mailed May 13, 2008; Apr. 27, 2009; and Oct. 27, 2011 and a Final Office Action mailed Dec. 9, 2008 in U.S. Appl. No. 11/491,219, filed Jul. 20, 2006.

Office Actions mailed Oct. 13, 2009; Dec. 13, 2010; and Sep. 19, 2011; and a Final Office Action mailed Apr. 15, 2010 in U.S. Appl. No. 11/740,874, filed Apr. 26, 2007.

Office Actions mailed Jun. 12, 2008 and May 22, 2009 and a Final Office Action mailed Dec. 16, 2008 in U.S. Appl. No. 11/711,224, filed Feb. 26, 2007.

Office Action mailed Apr. 22, 2010 in U.S. Appl. No. 11/538,048, filed Oct. 2, 2006.

Office Action mailed Apr. 1, 2008 and a Notice of Allowance mailed Aug. 12, 2008 in U.S. Appl. No. 11/615,883, filed Dec. 22, 2006.

Office Action mailed Apr. 14, 2010 in U.S. Appl. No. 11/998,772, filed Nov. 30, 2007.

Office Action mailed Sep. 6, 2011 in U.S. Appl. No. 12/080,673, filed Apr. 2, 2008.

Office Actions mailed Jun. 19, 2009 and Dec. 8, 2009; and a Notice of Allowance mailed Feb. 17, 2011 in U.S. Appl. No. 11/894,867, filed Aug. 21, 2007.

Office Action mailed Feb. 11, 2011 in U.S. Appl. No. 12/229,043, filed Aug. 18, 2008.

Office Action mailed Aug. 10, 2011 in U.S. Appl. No. 12/291,919, filed Nov. 13, 2008.

Office Action mailed Sep. 22, 2011 in U.S. Appl. No. 12/150,887, filed Apr. 30, 2008.

Notice of Allowance mailed May 21, 2008 in U.S. Appl. No. 11/978,905, filed Oct. 29, 2007.

Notice of Allowance mailed May 14, 2009 in U.S. Appl. No. 12/008,036, filed Jan. 7, 2008.

Office Actions mailed Nov. 3, 2009 and Jan. 20, 2011; Final Office Actions mailed Apr. 19, 2010 and Sep. 27, 2011 and an Advisory Action mailed Jun. 29, 2010 in U.S. Appl. No. 12/154,642, filed May 22, 2008.

Office Actions mailed Oct. 2, 2009 and Sep. 2, 2011 in U.S. Appl. No. 12/069,295, filed Feb. 7, 2008.

Office Action mailed Nov. 15, 2011 in U.S. Appl. No. 12/231,245, filed Aug. 28, 2008.

International Search Report mailed Dec. 14, 2009 in PCT patent application No. PCT/US2009/005854 filed Oct. 27, 2009.

Office Action mailed Nov. 26, 2010; Final Office Action mailed Aug. 8, 2011 and an Advisory Action mailed Oct. 19, 2011 in U.S. Appl. No. 12/363,636, filed Jan. 30, 2009.

(56) References Cited

OTHER PUBLICATIONS

International Search Report mailed Dec. 18, 2009 in PCT patent application No. PCT/US2009/005853 filed Oct. 27, 2009.
Office Action mailed Jun. 14, 2012 in U.S. Appl. No. 12/363,646, filed Jan. 30, 2009.
Office Actions mailed Mar. 26, 2010 and Nov. 15, 2010 in U.S. Appl. No. 12/259,176, filed Oct. 27, 2008.
International Search Report mailed Jan. 20, 2012 in PCT patent application No. PCT/US2011/053117 filed Sep. 23, 2011.
Office Action mailed Sep. 10, 2012 in U.S. Appl. No. 12/895,834, filed Sep. 30, 2010.
Office Action mailed Jan. 25, 2011 and a Final Office Action mailed Oct. 19, 2011 in U.S. Appl. No. 12/844,783, filed Jul. 27, 2010.
International Search Report mailed Dec. 9, 2011 in PCT patent application No. PCT/US2011/046864 filed Aug. 5, 2011.
International Search Report mailed Dec. 12, 2011 in PCT patent application No. PCT/US2011/047484 filed Aug. 11, 2011.
Final Office Action mailed Aug. 31, 2012 and an Office Action mailed Sep. 28, 2011 in U.S. Appl. No. 12/961,390, filed Dec. 6, 2010.
Office Action mailed Feb. 16, 2011 in U.S. Appl. No. 12/887,025, filed Sep. 21, 2010.
International Search Report mailed Jan. 17, 2012 in PCT patent application No. PCT/US2011/051945 filed Sep. 16, 2011.
International Search Report mailed Jan. 18, 2012 in PCT patent application No. PCT/US2011/052659 filed Sep. 21, 2011.
International Search Report mailed Jan. 17, 2012 in PCT patent application No. PCT/US2011/051950 filed Sep. 16, 2011.

* cited by examiner

STATIC PHASE MASK FOR HIGH-ORDER SPECTRAL PHASE CONTROL IN A HYBRID CHIRPED PULSE AMPLIFIER SYSTEM

CROSS REFERENCE TO RELATED APPLICATIONS

The present application is a Divisional application of and claims the priority benefit of U.S. patent application Ser. No. 11/998,772, filed Nov. 30, 2007, titled "STATIC PHASE MASK FOR HIGH-ORDER SPECTRAL PHASE CONTROL IN A HYBRID CHIRPED PULSE AMPLIFIER SYSTEM," issued Mar. 8, 2011, as U.S. Pat. No. 7,903,326, the disclosure of which is incorporated herein by reference.

BACKGROUND

1. Field of the Invention

The present invention relates in general to the field of laser light amplification.

2. Related Art

Chirped Pulse Amplification (CPA) is very useful for producing ultrashort-duration high-intensity pulses for use in high peak power ultrashort pulse laser systems. CPA increases the energy of an ultrashort laser pulse while avoiding optical amplifier damage and excessive nonlinear distortion. In this technique, the duration of the pulse is increased by first dispersing the ultrashort laser pulse temporally as a function of wavelength (a process called "chirping") to produce a chirped pulse, then amplifying the chirped pulse, and then recompressing the chirped pulse to significantly shorten its duration. Lengthening the pulse in time reduces the peak power of the pulse and, thus, allows energy to be added to the pulse without incurring excessive nonlinearities or reaching a damage threshold of the pulse amplifier and optical components. The amount of pulse amplification that can be achieved is typically proportional to the amount of pulse stretching and compression. Typically, the greater the amount of stretching and compression, the greater the possible pulse amplification.

A CPA system typically comprises an optical stretcher, an optical amplifier, and an optical compressor. The optical stretcher and optical compressor are ideally configured to have equal but opposite dispersive properties to perfectly compensate for one another to minimize the pulse width of an amplified optical pulse. Any material through which an optical pulse propagates may add dispersion to the optical pulse. For example, another optical component such as the optical amplifier may add dispersion to the optical pulse that is not compensated even by a perfectly matched optical stretcher and compressor pair.

The optical stretcher may comprise a bulk diffraction grating, an optical fiber, a fiber grating, or other dispersive optical elements. Optical fiber-based dispersive optical elements are generally not used in the optical compressor because the peak power of an optical pulse within the optical compressor is generally larger than an optical fiber's nonlinear threshold. Therefore, bulk diffraction gratings are generally used in optical compressors due to the ability of bulk diffraction gratings to handle larger optical power levels than optical fibers. In a CPA system with a bulk grating-based stretcher and a bulk grating-based compressor, any desired pulse shaping or dispersion compensation would typically be done in the stretcher to provide finer phase control and better resolution.

There is a motivation to use a same type of dispersive element (albeit with opposite dispersion properties) in both the optical stretcher and the optical compressor in order for the optical compressor to achieve maximum dispersion compensation of the optical stretcher. In addition, there is a motivation to use compact dispersive elements such as optical fiber instead of bulk diffraction gratings wherever possible because the compact dispersive elements enable systems to be more compact and to be optically aligned with greater ease. Hybrid chirped pulse amplifier systems balance benefits and drawbacks of different dispersive elements by using different technologies in the optical stretcher and the optical compressor. For example, a hybrid CPA system may use a fiber-based optical stretcher and a bulk diffraction grating-based optical compressor.

Mismatched dispersive element technologies in an optical stretcher and an optical compressor of a hybrid CPA system lead to mismatched dispersion properties. For example, an optical stretcher comprising an optical fiber may have different dispersion properties than an optical compressor comprising a bulk optical grating, because an optical fiber material has different optical properties than a bulk optical grating. Consequently, the optical compressor cannot adequately compensate for the dispersion of the optical stretcher in higher orders, such as fourth order, fifth order, sixth order, and above. These higher order dispersion terms cause temporal spreading in an output optical pulse, and consequently prevent the output optical pulse from reaching the picosecond (ps) or femtosecond (fs) time durations that are desired. In a typical hybrid CPA system, the stretcher and compressor are designed to be approximately matched to lower orders, such as group velocity dispersion and/or third order dispersion.

Mismatched dispersion properties of the optical stretcher and optical compressor in a hybrid CPA system, combined with additional dispersion in the optical amplifier, have motivated development of techniques for compensation of the dispersion mismatch to achieve either the shortest possible output optical pulse width or the most accurate arbitrary optical waveform possible. However, to date, no dispersion compensation techniques capable of compensating for dispersion matches above the fifth order in a hybrid CPA system have been reported. Even at fifth order, the reported dispersion compensation technique in U.S. Pat. No. 5,847,863 entitled "Hybrid Short-Pulse Amplifiers with Phase-Mismatch Compensated Pulse Stretchers and Compressors" and issued Dec. 8, 1998 required that the spatially chirped beam be nonlinearly chirped, which is difficult because the nonlinear spatial chirp is much smaller than the linear spatial chirp. Furthermore, in U.S. Pat. No. 5,847,863, Galvanauskas et al. teach that at high energies, the Treacy configuration is preferable for pulse compression because the absence of any additional material between gratings make the optical compressor less susceptible to optical damage and nonlinear effects.

SUMMARY

Various embodiments of the invention comprise an optical amplifier and an optical pulse compressor. The optical amplifier is configured to optically amplify a chirped optical pulse. The optical pulse compressor is configured to compress the optically amplified chirped optical pulse. The optical pulse compressor includes a bulk optical grating configured to spatially disperse the optically amplified chirped optical pulse into a spatially dispersed optical pulse and direct the spatially dispersed optical pulse in a first direction along a first path. The optical pulse compressor further includes an optical phase mask configured to perform dispersion compensation of the spatially dispersed optical pulse by adjusting an optical phase. Some embodiments further comprise an optical pulse stretcher coupled to the optical amplifier, wherein the optical pulse stretcher is configured to chirp a received optical pulse and output the chirped optical pulse to the optical amplifier. The optical pulse stretcher is of a type that does not include a bulk optical grating, such as an optical fiber, Bragg waveguide, or fiber Bragg grating. In some embodiments, the optical phase mask is configured to perform a fourth order, fifth order, and/or a sixth order dispersion compensation. In some embodiments, the optical pulse compressor further comprises a mirror configured to redirect the spatially dispersed optical pulse toward the bulk optical grating in a second direction along a second path. In these embodiments, the second direction is approximately opposite the first direction and the second path is offset from the first path by a distance approximately perpendicular to both the first and second directions. In some embodiments, the optical amplifier comprises an optical fiber amplifier.

Various embodiments of the invention comprise an optical amplifier and an optical pulse compressor. The optical amplifier is configured to optically amplify a chirped optical pulse. The optical pulse compressor is configured to compress the optically amplified chirped optical pulse. The optical pulse compressor includes a bulk optical grating configured to spatially disperse the optically amplified chirped optical pulse into a spatially dispersed optical pulse and direct the spatially dispersed optical pulse in a first direction along a first path. The optical pulse compressor further includes an optical phase mask configured to perform greater than 15 radians of dispersion compensation of the spatially dispersed optical pulse by adjusting an optical phase. Some embodiments further comprise an optical pulse stretcher coupled to the optical amplifier, wherein the optical pulse stretcher is configured to chirp a received optical pulse and output the chirped optical pulse to the optical amplifier. The optical pulse stretcher is of a type that does not include a bulk optical grating, such as an optical fiber, Bragg waveguide, or fiber Bragg grating. In some embodiments, the optical phase mask is configured to perform a fourth order dispersion compensation. In some embodiments, the optical phase mask is one of an array of optical phase masks disposed on a common substrate, and the optical pulse compressor is configured to select the optical phase mask by positionally adjusting the array relative to the first path of the spatially dispersed optical pulse. In some embodiments, the optical amplifier comprises an optical fiber amplifier.

Various embodiments of the invention comprise a method of performing dispersion compensation of a chirped pulse amplifier system using an optical phase mask including the following steps. A first step includes optically amplifying a chirped optical pulse. A second step includes spatially dispersing the optically amplified chirped optical pulse into a spatially dispersed optical pulse using a bulk optical grating within an optical pulse compressor. A third step includes performing dispersion compensation of the spatially dispersed optical pulse using an optical phase mask within the optical pulse compressor. A fourth step includes temporally compressing the dispersion compensated spatially dispersed optical pulse using the optical pulse compressor. The method may optionally include stretching an optical pulse, using an optical pulse stretcher being of a type that does not include a bulk optical grating, to produce the chirped optical pulse. The optical pulse may be stretched up to approximately 500 ps, or by greater than approximately 500 ps. In some embodiments, performing dispersion compensation includes performing a fourth order, fifth order, and/or sixth order dispersion compensation.

Various embodiments of the invention comprise a method of performing dispersion compensation of a chirped pulse amplifier system using an optical phase mask including the following steps. A first step includes stretching an optical pulse using an optical pulse stretcher being a type that does not include a bulk optical grating. A second step includes optically amplifying the stretched optical pulse. A third step includes spatially dispersing the optically amplified stretched optical pulse into a spatially dispersed optical pulse using a bulk optical grating within an optical pulse compressor. A fourth step includes performing greater than 15 radians of dispersion compensation of the spatially dispersed optical pulse using an optical phase mask within the optical pulse compressor. A fifth step includes temporally compressing the dispersion compensated spatially dispersed optical pulse using the optical pulse compressor. The optical pulse may be stretched up to approximately 500 ps, by between approximately 500 ps and 1 ns, by between approximately 1 ns and 2 ns, or by between approximately 2 ns and 5 ns. In some embodiments, performing greater than 15 radians of dispersion compensation further includes performing fourth order, fifth order, and/or sixth order dispersion compensation.

DETAILED DESCRIPTION

In various embodiments, a chirped pulse amplification (CPA) system comprises an optical pulse stretcher and an optical pulse compressor that are mismatched in that the optical pulse compressor includes a bulk optical grating while the optical pulse stretcher does not. Because the optical pulse stretcher and the optical pulse compressor are mismatched, higher order dispersion properties of the optical pulse stretcher and the optical pulse compressor are also mismatched and cannot effectively compensate for one another. High order dispersion compensation is provided by an optical phase mask disposed within the optical pulse compressor.

Figure 1:
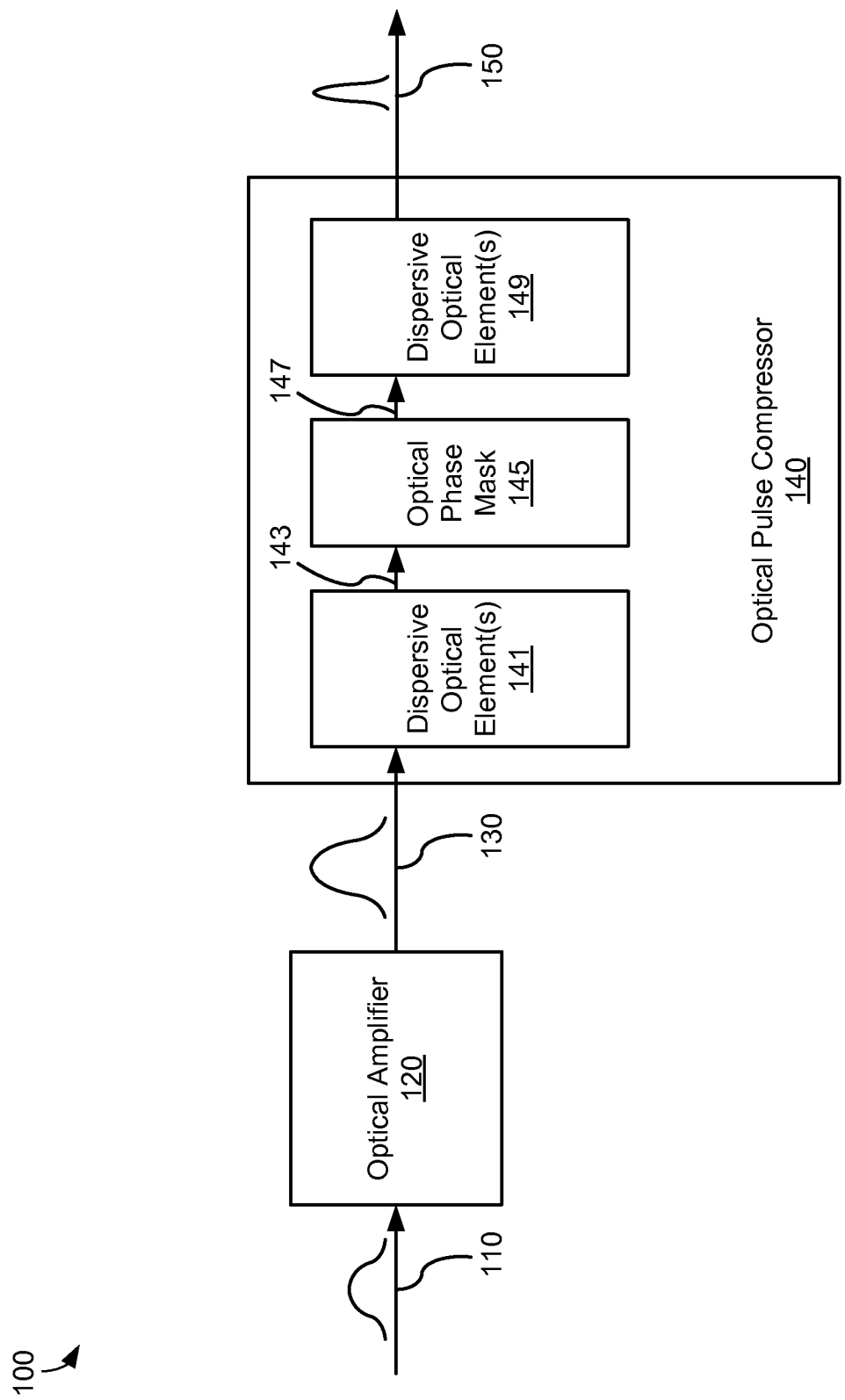
FIG. 1 is a block diagram illustrating a chirped pulse amplifier system, according to various embodiments of the invention.

FIG. 1 is a block diagram illustrating a chirped pulse amplifier system 100, according to various embodiments of the invention. The chirped pulse amplifier system 100 comprises an optical amplifier 120 and an optical pulse compressor 140. The chirped pulse amplifier system 100 is configured to amplify and compress an input chirped optical pulse 110 to produce a compressed amplified optical pulse 150. The chirped pulse amplifier system 100 may be configured to produce a compressed amplified optical pulse 150 that is less than approximately 3 picoseconds (ps), 1 ps, 600 fs, 500 fs, 250 fs, or 100 fs in duration.

The frequency chirp present in the chirped optical pulse 110 enables the chirped pulse amplifier system 100 to compress the chirped optical pulse 110 using the optical pulse compressor 140. The chirped optical pulse 110 is typically a frequency chirped optical pulse with a duration that is several orders of magnitude longer than an intended duration of the output compressed amplified optical pulse 150. The chirped optical pulse 110 may be generated by a laser configured to generate a frequency chirped optical pulse (not shown). As another example, the chirped optical pulse 110 may be generated by a dispersive and/or nonlinear optical element (as described elsewhere herein with respect to FIG. 2) configured to frequency chirp an input optical pulse to produce the chirped optical pulse 110. The peak power of the chirped optical pulse 110 is configured to be within a range that does not cause damage to the optical amplifier 120 or cause the chirped optical pulse 110 to incur excessive nonlinearities or other detrimental effects as the optical amplifier 120 amplifies the chirped optical pulse 110.

The optical amplifier 120 is configured to receive and amplify the chirped optical pulse 110, producing an amplified chirped optical pulse 130. The optical amplifier 120 may comprise a solid state laser amplifier and/or a fiber amplifier such as an erbium doped fiber amplifier (EDFA), ytterbium doped fiber amplifier (YDFA), erbium-ytterbium co-doped fiber amplifier, or thulium doped fiber amplifier (TDFA), or may utilize another optical amplifier technology. Fiber amplifiers typically route an input chirped optical pulse 110 through a greater amount of material (e.g., optical fiber/glass) than a solid state laser amplifier before outputting the amplified chirped optical pulse 130.

The optical amplifier 120 is configured to direct the amplified chirped optical pulse 130 into the optical pulse compressor 140 for temporal compression. The optical pulse compressor 140 is configured to spatially disperse the spectral components of the amplified chirped optical pulse 130 to produce a spatially dispersed optical pulse 143. An optical phase mask 145 may be inserted in a path of the spatially dispersed optical pulse 143 to apply a different phase delay to each of a plurality of wavelength regions within the spectrum of the spatially dispersed optical pulse 143.

In various embodiments, the optical pulse compressor 140 may comprise one, two, three, or four dispersive optical elements such as reflective bulk optical gratings. The optical pulse compressor also may comprise reflective elements and/or beam steering elements (not shown) to direct the amplified chirped optical pulse 130 to bounce off a reflective bulk optical grating four times. In some embodiments, the amplified chirped optical pulse 130 may bounce off the same reflective bulk optical grating more than once. The first bounce of the amplified chirped optical pulse 130 off of a reflective bulk optical grating causes the amplified chirped optical pulse 130 to spatially disperse with spectral components at different wavelengths having different angles of reflectance with respect to the reflective bulk optical grating. The second bounce of the amplified chirped optical pulse 130 off of a reflective bulk optical grating collimates the spatially dispersed spectral components at different wavelengths by reflecting at the same angle with respect to the reflective bulk optical grating while maintaining the spatial dispersion of the spectral components. Third and fourth bounces reverse the processes of the second and first bounces, respectively.

As illustrated in FIG. 1, the optical pulse compressor 140 comprises a first dispersive optical element 141, an optical phase mask 145, and a second dispersive optical element 149. The optical pulse compressor 140 may also comprise additional optical elements such as a mirror (not shown) and/or a lens (not shown) to direct and/or focus an optical path between the first dispersive optical element 141, the optical phase mask 145, and the second dispersive optical element 149. Each of the first dispersive optical element 141 and the second dispersive optical element 149 may include multiple dispersive optical elements.

The first dispersive optical element 141 is configured to spatially disperse the frequency spectrum of the amplified chirped optical pulse 130 and direct a spatially dispersed optical pulse 143 toward the optical phase mask 145. The first dispersive optical element 141 is also configured to partially compensate for the frequency chirp of the amplified chirped optical pulse 130.

The dispersive optical element 141 may comprise a transmissive dispersive optical element or a reflective dispersive optical element. The dispersive optical element 141 may comprise a bulk dispersive optical element such as a bulk diffraction grating, a prism, or another dispersive optical element that is configured to spatially separate spectral components of the amplified chirped optical pulse 130. Generally, a bulk dispersive optical grating is used because high peak optical powers within the optical pulse compressor 140 typically prevent optical fiber based dispersive optical elements from being used due to high nonlinearities or damage resulting from the high peak optical powers. The bulk dispersive optical element may be configured with an arrangement of beam-directing optical elements to cause the amplified chirped optical pulse 130 to impinge upon the bulk dispersive optical element twice. In some embodiments, the dispersive optical element 141 comprises a pair of bulk dispersive optical gratings. A pair of bulk dispersive optical gratings may be used to provide greater flexibility in alignment and to enable using smaller gratings than would be required if only one grating were used. The dispersion properties of the dispersive optical element 141 are configured to partially compensate for the frequency chirp of the amplified chirped optical pulse 130 and thereby cause the dispersed optical pulse 143 to have a shorter temporal duration than the amplified chirped optical pulse 130.

The optical phase mask 145 may be configured to adjust an optical phase of the spatially dispersed optical pulse 143 to produce a phase adjusted optical pulse 147. The optical phase mask 145 is placed approximately perpendicular to the direction of propagation of the spatially dispersed optical pulse 143 and approximately at a plane of maximum spatial dispersion of the spatially dispersed optical pulse 143. The optical phase mask 145 is configured to have a plurality of optical phase adjusting spatial regions, each optical phase adjusting spatial region configured to adjust an optical phase of a specific spectral range within the spatially dispersed optical pulse 143. Each optical phase adjusting spatial region may be configured to adjust an optical phase by an amount different from other optical phase adjusting spatial regions. The ability to adjust the optical phases of different spectral ranges within the spatially dispersed optical pulse 143 allows the optical phase mask 145 to be configured to perform higher order dispersion compensations including third order, fourth order, fifth order, sixth order, and/or seventh order. The optical phase mask 145 may be configured to perform an arbitrary combination of multiple orders of phase compensation. An arbitrary combination of multiple orders of dispersion compensation may be provided, for example, to compensate for nonlinearities.

The optical phase mask 145 may be coupled with an optical amplitude mask (not shown) configured to selectively attenuate the optical power of a specific spectral range of the spatially dispersed optical pulse 143 contained within an optical attenuation spatial region such that each optical attenuation spatial region within the optical amplitude mask may be characterized by a different optical attenuation value.

The optical phase mask 145 may be constructed using a variety of materials and technologies capable of transmitting or reflecting an optical pulse with a deterministic temporal or phase delay. The optical phase mask 145 may comprise a substrate such as glass, fused silica, dielectric, or semiconductor that is optically transparent or partially transparent at the operating wavelength of interest, such as approximately 800 nm, 1000 nm, 1300 nm, or 1550 nm. The optical phase mask 145 may also be integral with a mirror, or constructed using a deformable mirror. The optical phase mask 145 may be fabricated using mechanical fabrication techniques such as diamond turning or through material deposition on a substrate. The optical phase mask 145 may be fabricated by etching using a laser, electron beam, or chemical solution in conjunction with a photoresist material on a substrate. The optical phase mask 145 may also be fabricated using a mold or preform in conjunction with an injection or compression mold process. The optical phase mask 145 may also be fabricated using holographic techniques or processes used to fabricate diffraction gratings. The optical phase mask 145 may also employ materials having different indices of refraction within different optical attenuation spatial regions. Various embodiments of the optical phase mask 145 are discussed in greater detail elsewhere herein with reference to FIGS. 6 and 7.

The second dispersive optical element 149 is configured to undo the spatial dispersion of the frequency spectrum of the phase adjusted optical pulse 147 while completing the compensation of the frequency chirp begun by the first dispersive optical element 141. The second dispersive optical element 149 may be constructed substantially similar to the first dispersive optical element 141. The second dispersive optical element 149 may be configured to cause the phase adjusted optical pulse 147 to impinge upon a single bulk dispersive optical element twice or upon a pair of bulk dispersive optical elements in succession. The second dispersive optical element 149 then directs the resulting compressed amplified optical pulse 150 out of the optical pulse compressor 140. The second dispersive optical element 149 typically has approximately identical dispersive properties as the dispersive optical element 141.

In some embodiments, the second dispersive optical element 149 is omitted and the first dispersive optical element 141 is used again in place of the second dispersive optical element 149. In these embodiments, the optical pulse compressor 140 is configured to direct the phase adjusted optical pulse 147 toward the first dispersive optical element 141 instead of a separate second dispersive optical element 149. Thus, the compressed amplified optical pulse 150 emerges from the first dispersive optical element 141 in a direction approximately opposite a propagation direction of the input amplified chirped optical pulse 130. In these embodiments, the first dispersive optical element 141 is further configured to undo the spatial dispersion of the frequency spectrum of the phase adjusted optical pulse 147 while completing the compensation for the frequency chirp begun by the first dispersive optical element 141. The first dispersive optical element 141 then directs the compressed amplified optical pulse 150 out of the optical pulse compressor 140.

Figure 2:
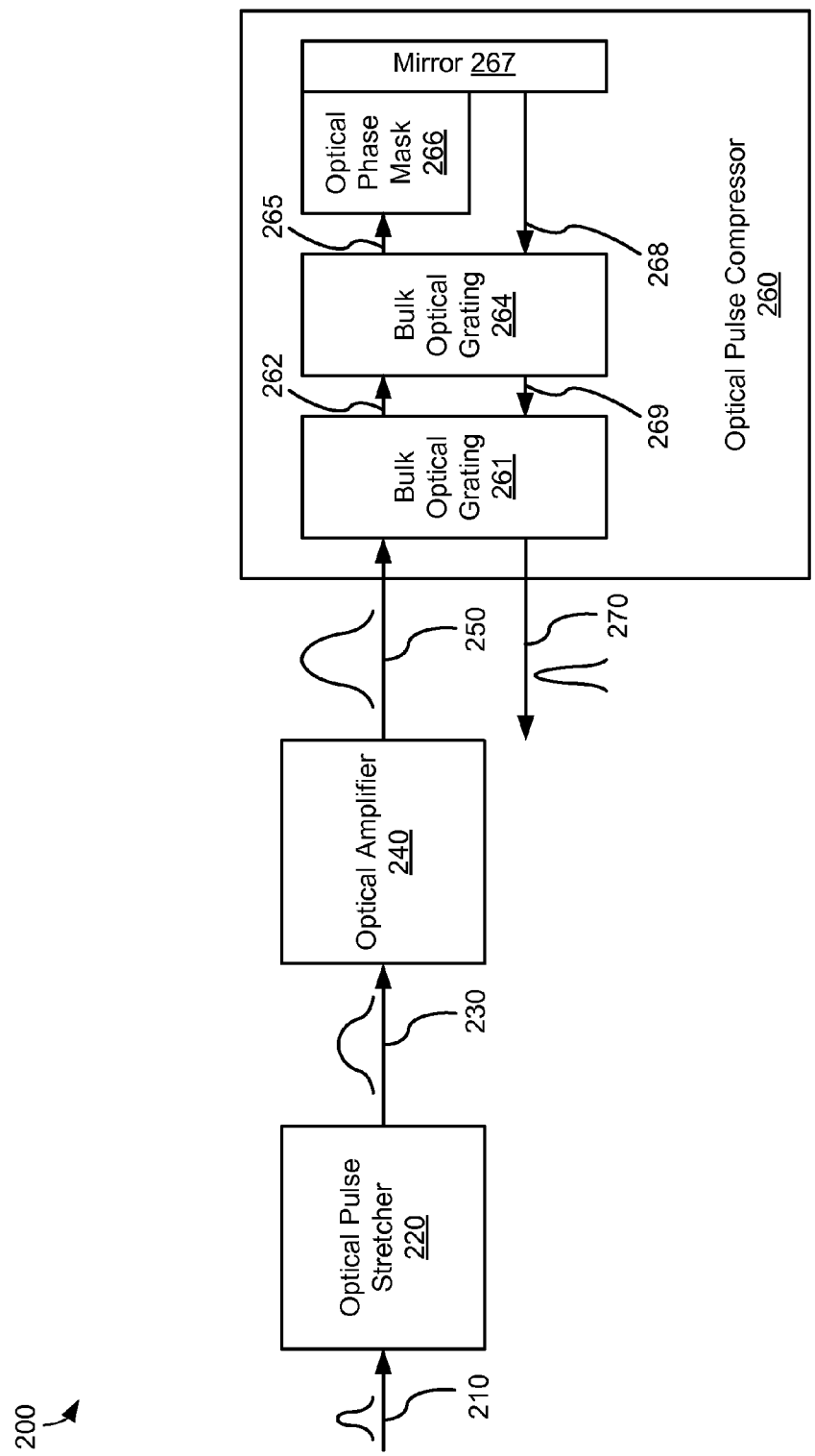
FIG. 2 is a block diagram illustrating a hybrid chirped pulse amplifier system, according to various embodiments of the invention.

FIG. 2 is a block diagram illustrating a hybrid chirped pulse amplifier system 200, according to various embodiments of the invention. The hybrid CPA system 200 comprises an optical pulse stretcher 220, an optical amplifier 240, and an optical pulse compressor 260. The hybrid CPA system 200 is an embodiment of the chirped pulse amplifier system 100 further comprising the optical pulse stretcher 220. The hybrid CPA system 200 is configured to perform chirped pulse amplification including higher order dispersion compensation using an optical phase mask 266 within the optical pulse compressor 260.

The optical pulse stretcher 220 is configured to receive an optical pulse 210, temporally stretch the optical pulse 210 while applying a frequency chirp to the optical pulse 210, and output a stretched optical pulse 230 toward the optical amplifier 240. The optical pulse stretcher 220 may comprise an optical fiber, a fiber Bragg grating, a Bragg waveguide, a volume Bragg grating, a photonic crystal fiber, or other dispersive optical element.

In the hybrid CPA system 200, the optical pulse stretcher 220 and the optical pulse compressor 260 operate on different principles. In other words, the optical pulse stretcher 220 and the optical pulse compressor 260 comprise different types of dispersive elements. For example, the optical pulse stretcher 220 may comprise an optical fiber while the optical pulse compressor 260 may comprise a bulk optical grating. An optical fiber may be used in the optical pulse stretcher 220 to chirp the optical pulse 210 with a frequency chirp by a nonlinear process such as self phase modulation (SPM) and/or a linear process such as group velocity dispersion (GVD). The optical pulse stretcher 220 may stretch the optical pulse 210 by less than approximately 30 ps, more than approximately 30 ps, more than approximately 100 ps, more than approximately 500 ps, more than approximately 1 ns, more than approximately 2 ns, or more than approximately 5 ns. A hybrid CPA system 200 configured to have an optical pulse stretcher 220 that provides a large stretch factor may require an optical pulse compressor that also provides large higher order dispersion compensation.

The optical amplifier 240 is configured to amplify the power of the stretched optical pulse 230 to produce an amplified optical pulse 250 that temporally corresponds to the stretched optical pulse 230 while having a larger power level than the stretched optical pulse 230. The optical amplifier 240 may comprise a fiber amplifier such as an erbium doped fiber amplifier (EDFA), ytterbium doped fiber amplifier (YDFA), erbium-ytterbium co-doped fiber amplifier, or thulium doped fiber amplifier (TDFA), or utilize another optical amplifier technology. The optical amplifier 240 is coupled with the optical pulse compressor 260 and configured to direct the amplified optical pulse 250 into the optical pulse compressor 260.

The optical pulse compressor 260 is configured to temporally compress the amplified optical pulse 250 to produce a compressed optical pulse 270. The optical pulse compressor 260 comprises a pair of bulk optical gratings 261 and 264 having dispersive properties and configured to receive the amplified optical pulse 250 propagating in a first direction and output the compressed optical pulse 270 propagating in a second direction, approximately opposite the first direction of the amplified optical pulse 250. A first pass through the bulk optical gratings 261 and 264 in the first direction begins and partially completes the temporal compression of the amplified optical pulse 250 and performs spatial dispersion to enable higher order dispersion compensation using an optical phase mask 266. A second pass through the bulk optical gratings 261 and 264 in the second direction continues and completes the temporal compression while undoing the spatial dispersion to produce the compressed optical pulse 270.

The bulk optical grating 261 is configured to diffract the amplified optical pulse 250 to produce a spatially dispersed optical pulse 262. The spatially dispersed optical pulse 262 comprises diverging optical rays due to the dispersive properties of the bulk optical grating 261 combined with the bandwidth of the optical spectrum within the amplified optical pulse 250. The bulk optical grating 264, by itself or in conjunction with a lens (not shown), may be configured to approximately spatially collimate the spatially dispersed optical pulse 262 to direct a collimated dispersed optical pulse 265 toward the optical phase mask 266.

The bulk optical gratings 261 and 264 compress an optical pulse through at least two processes. First, the bulk optical gratings 261 and 264 use properties of frequency dispersion to compensate for the frequency chirp applied by the optical pulse stretcher 220. For example, the bulk optical gratings 261 and 264 may apply a quadratic phase correction. Second, the bulk optical gratings 261 and 264 use properties of spatial dispersion to spatially disperse the optical spectrum of the optical pulse to enable the optical phase mask 266 to individually adjust an optical phase of distinct optical frequency ranges (spectral components) within the optical spectrum of the optical pulse.

The optical phase mask 266 may be placed near a mirror 267 at a location where the spectrum of the collimated dispersed optical pulse 265 is maximally spatially dispersed. The optical phase mask 266 may be configured to additionally function as an amplitude mask or be used in conjunction with an amplitude mask to selectively attenuate distinct optical frequency ranges (spectral components) within the optical spectrum of the collimated dispersed optical pulse 265.

The mirror 267 is configured to redirect a collimated dispersion compensated optical pulse 268 back through the bulk optical gratings 264 and 261. In some embodiments, the mirror 267 is configured to reflect the collimated dispersion compensated optical pulse 268 back through the optical phase mask 266 before reaching the bulk optical grating 264. As illustrated in FIG. 2, the optical phase mask 266 is disposed along a path of the collimated dispersed optical pulse 265 between the bulk optical grating 264 and the mirror 267. In other embodiments (not shown), the optical phase mask 266 may be disposed along a path of the collimated dispersed optical pulse 265 between the mirror 267 and the bulk optical grating 264 after the collimated dispersed optical pulse 265 reflects off of the mirror 267. In still other embodiments (not shown), the optical phase mask 266 may be disposed both between the bulk optical grating 264 and the mirror 267 along the path of the collimated dispersed optical pulse 265 and the collimated dispersion compensated optical pulse 268. In some embodiments (not shown), the optical phase mask 266 may be disposed between the first bulk optical grating 261 and the second bulk optical grating 264.

The bulk optical grating 264 is configured to diffract the collimated dispersion compensated optical pulse 268 to produce a spatially converging optical pulse 269 directed toward the bulk optical grating 261. The bulk optical grating 261 is configured to diffract the spatially converging optical pulse 269 to finish reversing the spatial dispersion begun by the bulk optical grating 261 and complete the temporal compression begun by the bulk optical grating 261 to produce and output the compressed optical pulse 270.

In further embodiments, additional mirrors 267 may be disposed along a path of the collimated dispersed optical pulse 265 and/or collimated dispersion compensated optical pulse 268. Additionally, more than one optical phase mask 266 may be disposed along a path of the dispersed optical pulse 262, collimated dispersed optical pulse 265, collimated dispersion compensated optical pulse 268, and/or spatially converging optical pulse 269.

Figure 3:
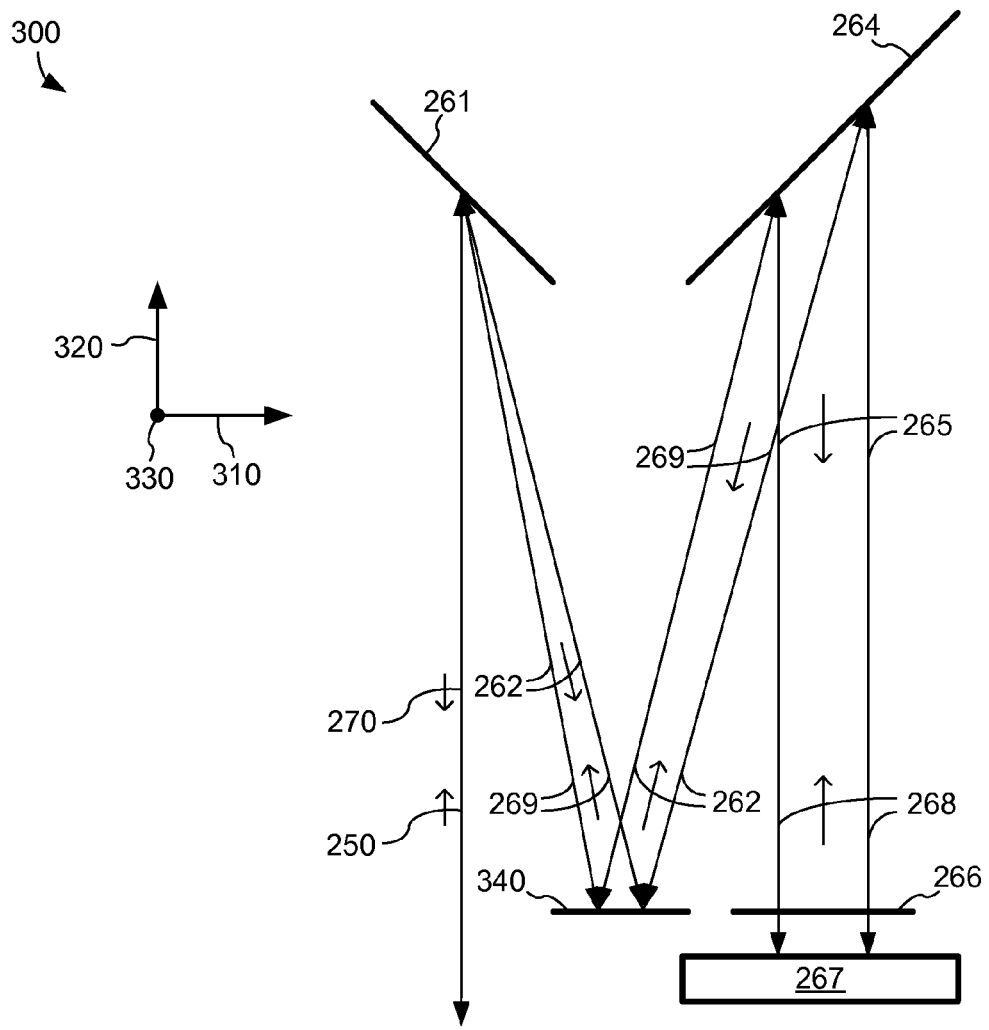
FIG. 3 is a diagram illustrating a side view of a grating compressor configured to perform dispersion compensation, according to various embodiments of the invention.

FIG. 3 is a diagram illustrating a side view of a grating compressor 300 configured to perform dispersion compensation, according to various embodiments of the invention. The grating compressor 300 represents a double-pass folded path grating compressor embodiment of the optical pulse compressor 260, described with reference to FIG. 2. As illustrated in FIG. 3, an optional mirror 340 is disposed between the bulk optical grating 261 and the bulk optical grating 264 along an optical path of the spatially dispersed optical pulse 262 and the spatially converging optical pulse 269. The mirror 340 is configured to reflect and direct a path of the spatially dispersed optical pulse 262 from the bulk optical grating 261 to the bulk optical grating 264. The mirror 340 is further configured to reflect and direct a path of the spatially converging optical pulse 269 from the bulk optical grating 264 to the bulk optical grating 261.

The bulk optical grating 261, mirror 340, bulk optical grating 264, and optical phase mask 266 are each disposed along a plane of a horizontal axis 330 perpendicular to the drawing of FIG. 3. The mirror 267 is disposed along a plane of a horizontal axis 310. The grating compressor 300 is configured to cause the collimated dispersed optical pulse 265 to travel along a path in a first propagation direction parallel with vertical axis 320. The mirror 267 may be configured to reflect and redirect the collimated dispersed optical pulse 265 such that the collimated dispersion compensated optical pulse 268 travels along a path in a second propagation direction approximately opposite the first propagation direction parallel with vertical axis 320. The path in the second propagation direction may be at a different position along the horizontal axis 330 perpendicular to the drawing of FIG. 3 than the collimated dispersed optical pulse 265. In these embodiments, the spatially converging optical pulse 269 travels along a path at a different position along the horizontal axis 330 perpendicular to the drawing of FIG. 3 than the spatially dispersed optical pulse 262, and the compressed optical pulse 270 travels along a path at a different position along the horizontal axis 330 perpendicular to the drawing of FIG. 3 than the amplified optical pulse 250.

The optical phase mask 266 may be positioned along a path in a first propagation direction of the collimated dispersed optical pulse 265 parallel with vertical axis 320 between the bulk optical grating 264 and the mirror 267 or along a path in a second propagation direction approximately opposite the first propagation direction of the collimated dispersed optical pulse 265 parallel with vertical axis 320 between the mirror 267 and the bulk optical grating 264 and configured to be in the path in only one of the first or second propagation direction. Alternatively, the optical phase mask 266 may be configured to be in the path in both propagation directions. In some embodiments, the optical phase mask 266 may be integral with the mirror 267, for example, by being disposed between multiple elements of the mirror 267 or by being integral with a mirror element. The optical phase mask 266 may alternatively be positioned between the bulk optical grating 261 and the bulk optical grating 264 along an optical path of the spatially dispersed optical pulse 262 and/or the spatially converging optical pulse 269 (not shown).

Figure 4:
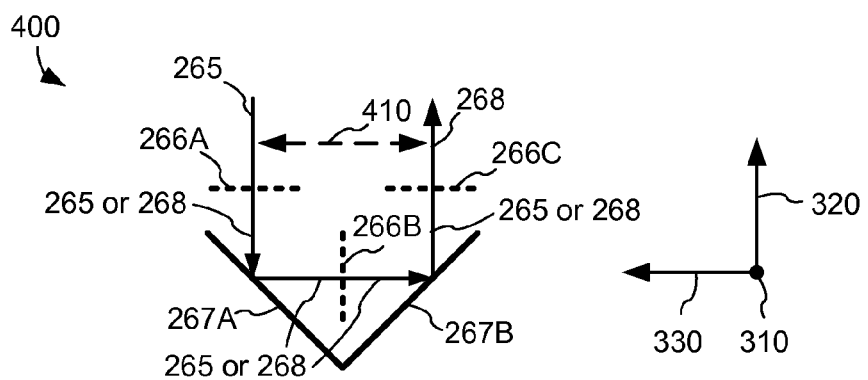
FIG. 4 is a diagram illustrating an end view of a roof mirror, according to various embodiments of the invention.

FIG. 4 is a diagram illustrating an end view of a roof mirror 400, according to various embodiments of the invention. The roof mirror 400 is an embodiment of the mirror 267 as illustrated in FIG. 3. The roof mirror 400 comprises a first mirror surface 267A and a second mirror surface 267B disposed at an approximately 90 degree angle with respect to one another. The first mirror surface 267A is disposed at an approximately 45 degree angle with respect to the first propagation direction of the collimated dispersed optical pulse 265 and configured to reflect the collimated dispersed optical pulse 265 toward the second mirror surface 267B. The second mirror surface 267B is configured to reflect the collimated dispersed optical pulse 265 at an approximately 45 degree angle such that the collimated dispersed optical pulse 265 propagates in the second propagation direction toward the bulk optical grating 264, described with reference to FIG. 3.

The roof mirror 400 is configured such that the path in the first propagation direction and the path in the second propagation direction of the collimated dispersed optical pulse 265 are displaced from one another along the horizontal axis 330 approximately by a distance 410. Consequently, paths of the following counter-propagating pairs of optical pulses illustrated in FIG. 3 may also be displaced from one another along the horizontal axis 330 approximately by the distance 410: the collimated dispersed optical pulse 265 and the collimated dispersion compensated optical pulse 268; the spatially dispersed optical pulse 262 and the spatially converging optical pulse 269; and the input amplified optical pulse 250 and the output compressed optical pulse 270.

The optical phase mask 266 is configured to adjust a phase of the collimated dispersed optical pulse 265 to produce the collimated dispersion compensated optical pulse 268. One or more embodiments of the optical phase mask 266 may be placed perpendicular to a path of the collimated dispersed optical pulse 265 in a first position 266A between the bulk optical grating 264 and the first mirror element 267A, in a second position 266B between the first mirror element 267A and the second mirror element 267B, and/or in a third position 266C between the second mirror element 267B and the bulk optical grating 264. The optical phase mask 266 may be configured to be placed both in the first position 266A and the third position 266C simultaneously.

Figure 5:
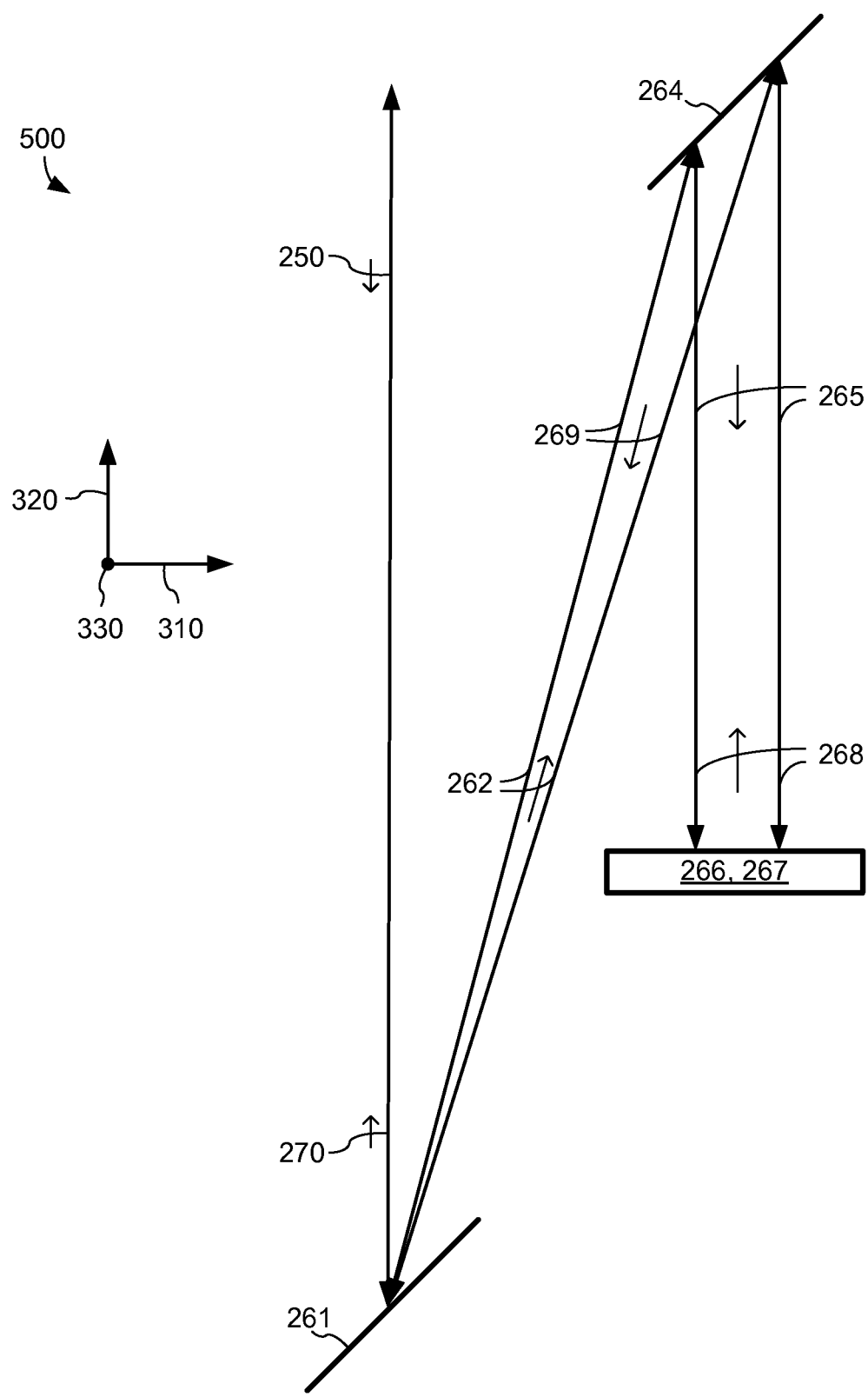
FIG. 5 is a diagram illustrating a side view of a grating compressor configured to perform dispersion compensation, according to various embodiments of the invention.

FIG. 5 is a diagram illustrating a side view of a grating compressor 500 configured to perform dispersion compensation, according to various embodiments of the invention. The grating compressor 500 represents an embodiment of the optical pulse compressor 260, described with reference to FIG. 2. The grating compressor 500 is similar to the grating compressor 300 except that the grating compressor 500 is configured without the optional mirror 340 between the bulk optical grating 261 and the bulk optical grating 264. As illustrated in FIG. 5, the optical phase mask 266 may be integral with the mirror 267.

Figure 6:
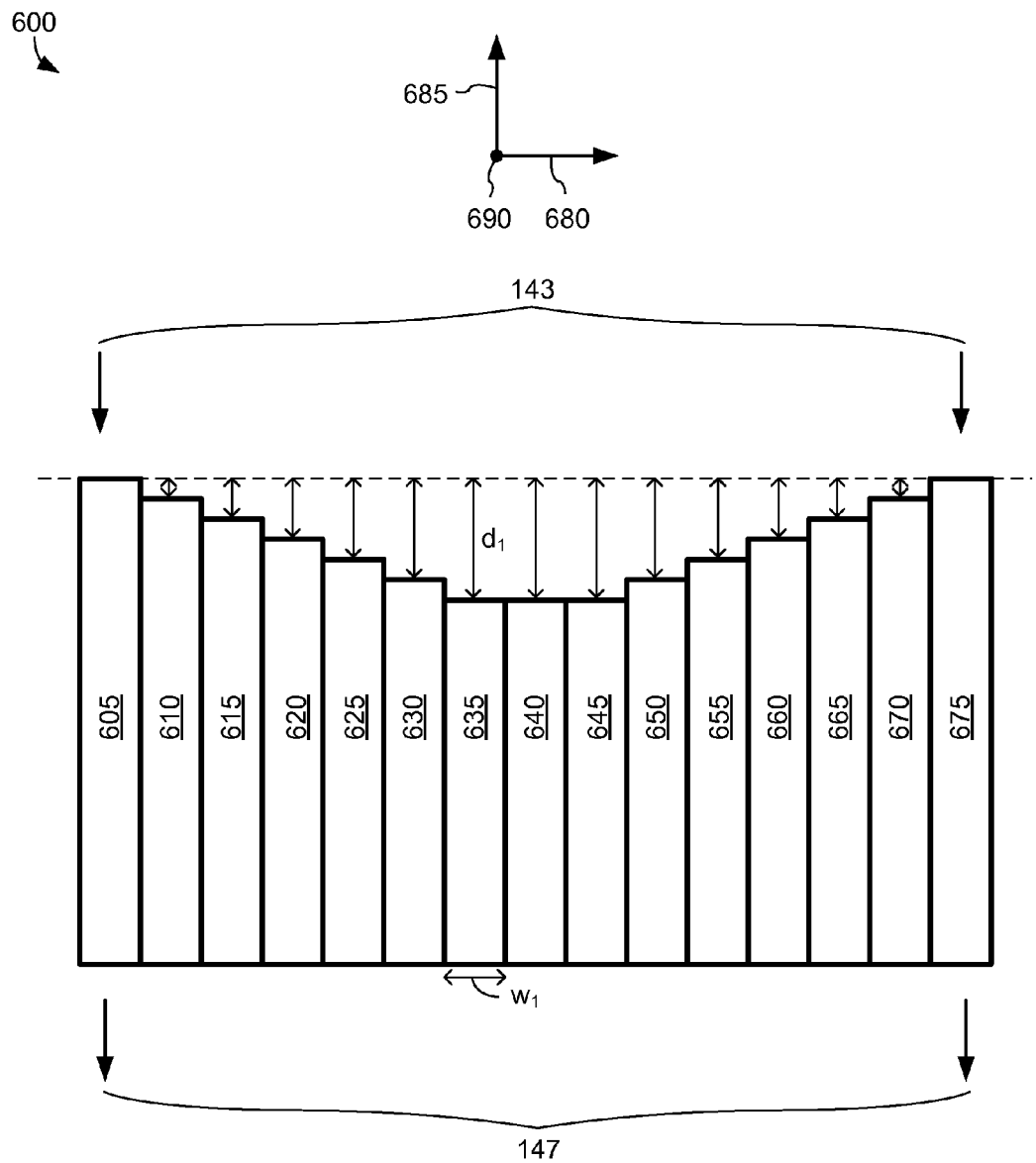
FIG. 6 is a diagram illustrating a side view of an optical phase mask, according to various embodiments of the invention.

FIG. 6 is a diagram illustrating a side view of an optical phase mask 600, according to various embodiments of the invention. The optical phase mask 600 comprises a plurality of optical phase adjusting spatial regions 605, 610, 615, 620, 625, 630, 635, 640, 645, 650, 655, 660, 670, and 675 adjacent to one another along a horizontal axis 680. Because a spatially dispersed optical pulse 143 propagating in a first propagation direction parallel with the vertical axis 685 is spectrally dispersed along a single axis, the plurality of optical phase adjusting spatial regions are configured to be adjacent to one another along a single axis. Each optical phase adjusting spatial region is characterized by a width $w_1$ parallel with the horizontal axis 680, a length parallel with a horizontal axis 690 perpendicular with FIG. 6, and a height differential $d_1$ relative to the first optical phase adjusting spatial region 605. The height differential $d_1$ is parallel with a vertical axis 685. The horizontal axis 680 and the horizontal axis 690 are perpendicular to one another and define a horizontal plane of the optical phase mask 600. A top surface of the optical phase mask 600 approximates a curve along the horizontal axis 680 due to a combination of the widths $w_1$ and height differentials $d_1$ associated with each optical phase adjusting special region.

The optical phase mask 600 comprises an optically transparent or semi-transparent material with an index of refraction that differs from an index of refraction of the surrounding environment, such as air. A relative phase adjustment between a first specific spectral range of the spatially dispersed optical pulse 143, traveling through a first optical phase adjusting spatial region such as optical phase adjusting spatial region 605, and a second specific spectral range of the spatially dispersed optical pulse 143, traveling through a second optical phase adjusting spatial region such as optical phase adjusting spatial region 635, results from a difference in propagation distance in the optical phase mask 600 of the first specific spectral range and the second specific spectral range. The difference in propagation distance in the optical phase mask 600 is due to the height differential $d_1$ between the optical phase adjusting spatial regions 605 and 635. The relative phase adjustment of all the specific spectral ranges of the spatially dispersed optical pulse 143 performed by the optical phase mask 600 produces the phase adjusted optical pulse 147 exiting the optical phase mask 600.

The optical phase mask 600 can be constructed with an approximately step function surface profile as illustrated in FIG. 6 rather than a smooth profile. The step function profile improves the spectral resolution and accuracy of the optical dispersion compensation performed by the optical phase mask 600, while also helping to prevent unwanted lensing effects on the spatially dispersed optical pulse 143. The width $w_1$ associated with each optical phase adjusting spatial region may be set based upon a beam size and spatial spread of the input spatially dispersed optical pulse 143. The height differential $d_1$ associated with each optical phase adjusting spatial region may be set based upon a desired dispersion compensation property. In an example, the width $w_1$ is approximately 3 mm, the height differential $d_1$ ranges from 0 to approximately 20 microns, and the length is approximately 25 mm. As illustrated, the optical phase mask 600 may perform up to fourth order dispersion compensation. By adjusting the height differential $d_1$ associated with each optical phase adjusting spatial region, other embodiments of the optical phase mask 600 may perform higher order dispersion compensation such as fifth order, sixth order, seventh order, and higher. An arbitrary combination of multiple orders of dispersion compensation may be provided, for example, to compensate for nonlinearities.

Figure 7:
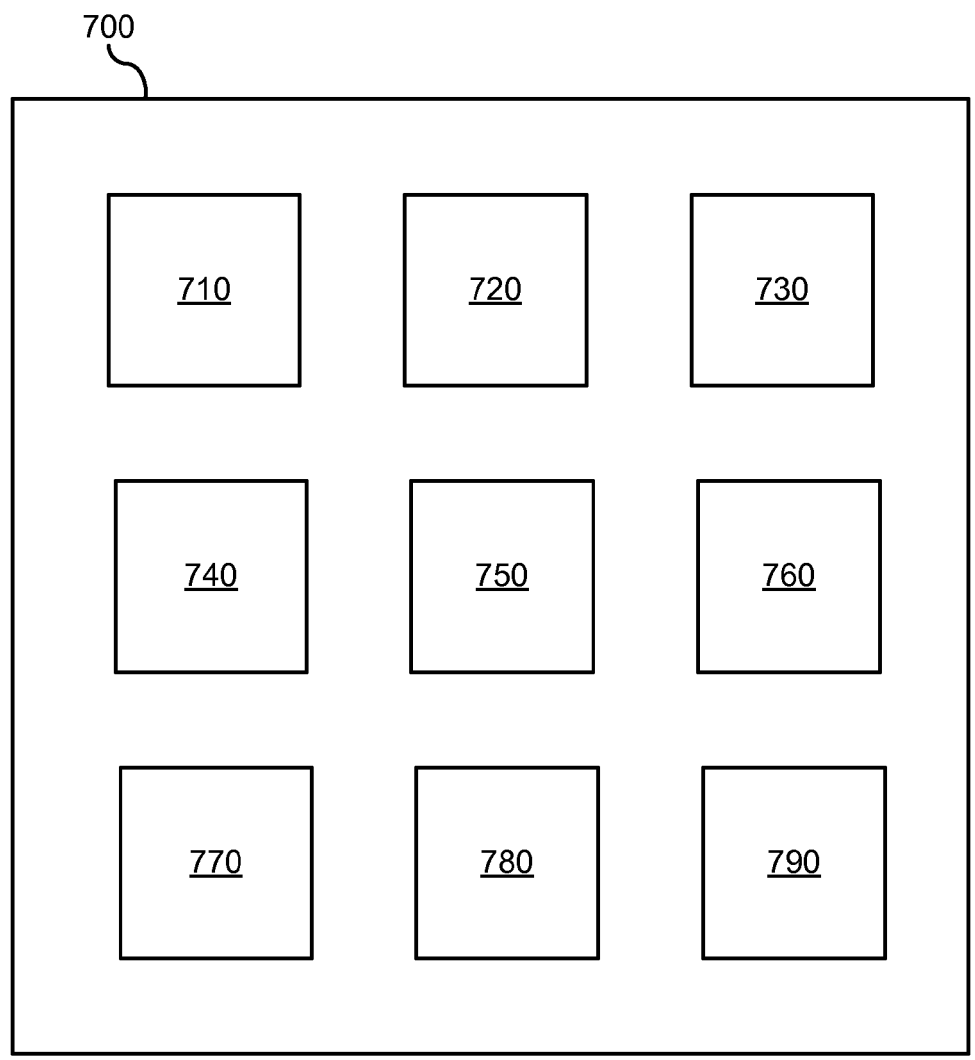
FIG. 7 is a diagram illustrating a top view of an array of static phase masks on a common substrate, according to various embodiments of the invention.
Figure 7:
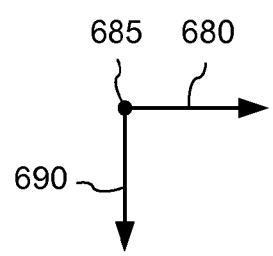

FIG. 7 is a diagram illustrating a top view of an array of static phase masks 700 on a common substrate, according to various embodiments of the invention. The array of static phase masks 700 comprises a plurality of optical phase masks 710, 720, 730, 740, 750, 760, 770, 780, and 790. Nine optical phase masks are shown in FIG. 7 for purposes of illustration, but in various embodiments an array of static phase masks 700 may comprise more or fewer optical phase masks disposed on a common substrate. Each optical phase mask in the array of static phase masks 700 may have different dispersion compensation properties from one or more of the other optical phase masks in the array of static phase masks 700.

An optical pulse compressor, such as optical pulse compressor 140 in chirped pulse amplification system 100, may comprise the array of static phase masks 700 in place of the optical phase mask 145. The optical pulse compressor 140 may be configured to adjust a position of the array of static phase masks 700 relative to a path of the spatially dispersed optical pulse 143 to select a first optical phase mask such as optical phase mask 710 instead of a second optical phase mask such as optical phase mask 720. At different times, the optical pulse compressor 140 may select a third optical phase mask such as optical phase mask 730. The optical pulse compressor 140 may be configured to produce a compressed amplified optical pulse 150 with different arbitrary optical waveforms such that a specific arbitrary optical waveform of the compressed amplified optical pulse 150 is determined based upon the optical phase mask selected from the array of static phase masks 700.

For example, an amplification system such as the chirped pulse amplifier system 100 may be configured to use a first optical phase mask such as optical phase mask 710 to cause the output compressed amplified optical pulse 150 to have a first specific desired temporal waveform at a first time, and use a second optical phase mask such as optical phase mask 720 to cause the output compressed amplified optical pulse 150 to have a second specific desired temporal waveform at a second time.

Figure 8:
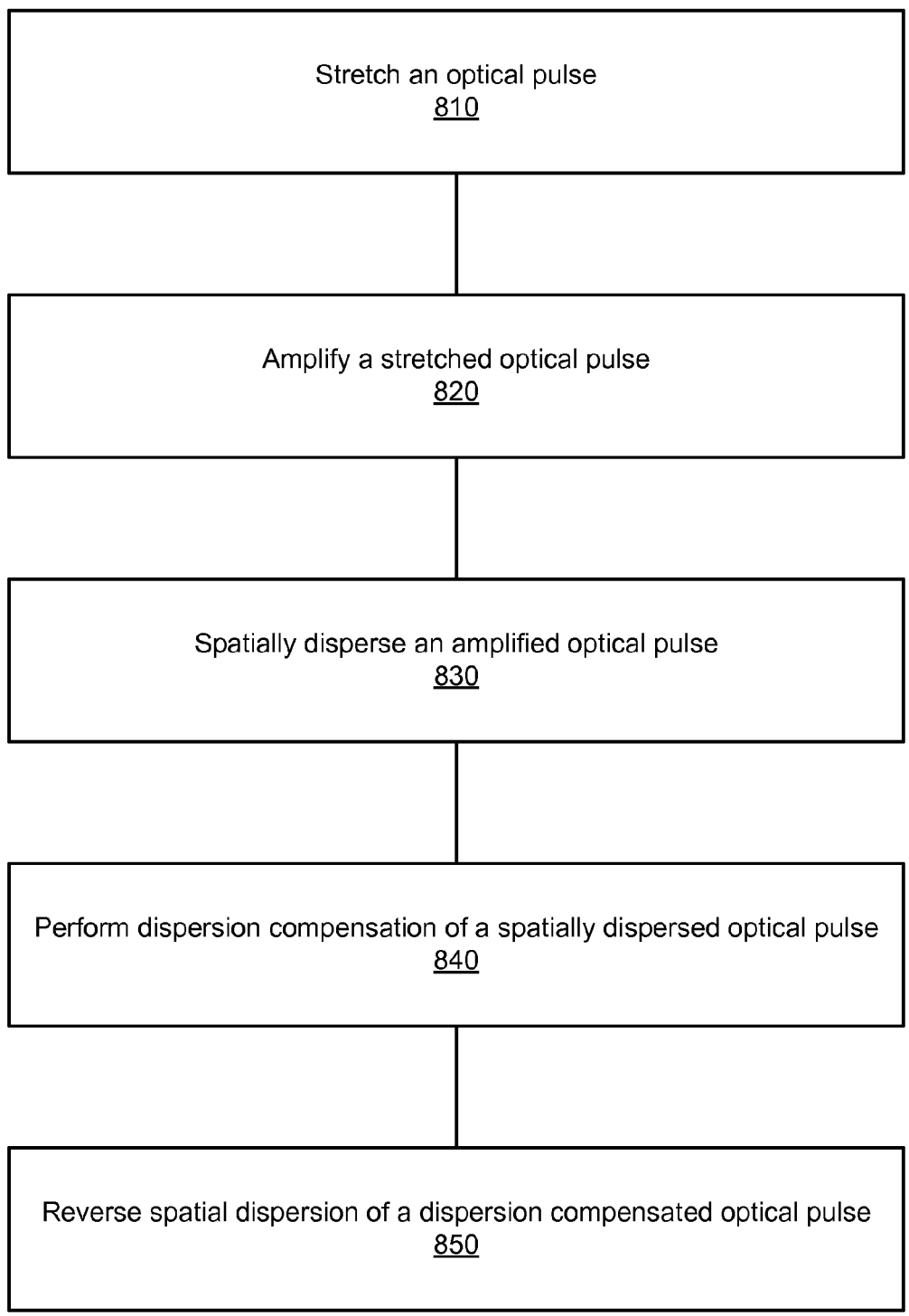
FIG. 8 is a block diagram illustrating methods of performing dispersion compensation of a chirped pulse amplifier system using an optical phase mask, according to various embodiments of the invention.

FIG. 8 is a block diagram illustrating methods of performing dispersion compensation of a chirped pulse amplifier system using an optical phase mask, according to various embodiments of the invention.

In a step 810, an optical pulse is stretched using an optical pulse stretcher to produce a stretched optical pulse. The optical pulse may be received from an optical source such as a laser. The optical pulse stretcher is of a type that does not comprise a bulk optical grating, such as an optical fiber, fiber Bragg grating, or a Bragg fiber waveguide. The optical pulse stretcher uses properties of dispersion such as Group Velocity Dispersion (GVD) and/or optical nonlinearities such as Self Phase Modulation (SPM) to apply a frequency chirp to the optical pulse such that the stretched optical pulse is chirped. The optical pulse stretcher may stretch the optical pulse by up to approximately 30 ps, greater than approximately 30 ps, greater than approximately 100 ps, greater than approximately 500 ps, greater than approximately 1 ns, greater than approximately 2 ns, or greater than approximately 5 ns.

In a step 820, the stretched optical pulse is optically amplified by an optical amplifier to generate an amplified optical pulse. The optical amplifier may be a fiber amplifier such as an erbium doped fiber amplifier (EDFA), ytterbium doped fiber amplifier (YDFA), erbium-ytterbium co-doped fiber amplifier, or thulium doped fiber amplifier (TDFA), or utilize another optical amplifier technology. The optical amplifier may affect the stretched optical pulse with nonlinearities and/or dispersion. The more material such as optical fiber or glass that an optical pulse propagates through in an optical amplifier, the greater amount of dispersion compensation at higher orders will be needed in the chirped pulse amplifier system.

In a step 830, the amplified optical pulse is spatially dispersed by a bulk optical grating within an optical pulse compressor. The spatial dispersion of the frequency spectrum of the amplified optical pulse is an angular dispersion along a single spatial axis. As the amplified optical pulse is spatially dispersed, the frequency chirp of the amplified optical pulse due to the optical stretcher is also partially compensated.

In a step 840, an optical phase mask performs dispersion compensation of the spatially dispersed optical pulse by adjusting an optical phase of one or more specific spectral ranges of the spatially dispersed optical pulse to produce a dispersion compensated optical pulse. Each specific spectral range of the spatially dispersed optical pulse occupies a different optical phase adjusting spatial region of the optical phase mask. Each optical phase adjusting spatial region of the optical phase mask adjusts an optical phase of the specific spectral range of the spatially dispersed optical pulse that impinges on that optical phase adjusting spatial region. In various embodiments, less than 15 radians, more than 15 radians, more than 30 radians, more than 50 radians, or more than 100 radians of dispersion compensation is performed. Fourth order, fifth order, sixth order, seventh order, and/or higher order dispersion compensation may be performed.

In a step 850, the spatial dispersion of the dispersion compensated optical pulse is reversed by a bulk optical grating within the optical pulse compressor. As the spatial dispersion of the dispersion compensated optical pulse is undone, compensation of the frequency chirp of the dispersion compensated optical pulse due to the optical stretcher is completed. In some embodiments, the bulk optical gratings used in both step 830 and step 850 may be the same.

The embodiments illustrated, described, and/or discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
   an optical amplifier configured to optically amplify a chirped optical pulse; and
   an optical pulse compressor configured to compress the optically amplified chirped optical pulse, the optical pulse compressor including
   a bulk optical grating configured to spatially disperse the optically amplified chirped optical pulse into a spatially dispersed optical pulse and direct the spatially dispersed optical pulse in a first direction along a first path, and
   an optical phase mask configured to perform dispersion compensation of the spatially dispersed optical pulse by adjusting an optical phase; and
   an optical pulse stretcher coupled to the optical amplifier and configured to output a chirped optical pulse to the optical amplifier.

2. The system of claim 1 wherein the optical pulse stretcher is configured to chirp a received optical pulse and output the chirped optical pulse to the optical amplifier.

3. The system of claim 1 wherein the optical pulse stretcher comprises an optical fiber.

4. The system of claim 1 wherein the optical phase mask performs a fourth order dispersion compensation of the spatially dispersed optical pulse.

5. The system of claim 1 wherein the optical phase mask is configured to perform a fifth order dispersion compensation of the spatially dispersed optical pulse.

6. The system of claim 1 wherein the optical phase mask is incorporated into a glass substrate.

7. The system of claim 1 further comprising a mirror, wherein the optical phase mask is integral with a surface of the mirror.

8. The system of claim 1 wherein the optical phase mask comprises a deformable mirror.

9. The system of claim 1 further comprising a mirror configured to redirect the spatially dispersed optical pulse toward the bulk optical grating in a second direction along a second path, the second direction being approximately opposite the first direction, and the second path being offset from the first path and being substantially perpendicular to both the first and second directions.

* * * * *